US006897434B1

(12) United States Patent
Kumar et al.

(10) Patent No.: US 6,897,434 B1
(45) Date of Patent: May 24, 2005

(54) ALL-FIBER PHOTON-PAIR SOURCE FOR QUANTUM COMMUNICATIONS

(75) Inventors: Prem Kumar, Skokie, IL (US); Marco Florentino, Boston, MA (US); Paul L. Voss, Evanston, IL (US); Jay E. Sharping, Evanston, IL (US)

(73) Assignee: Northwestern University, Evanston, IL (US)

( * ) Notice: Subject to any disclaimer, the term of this patent is extended or adjusted under 35 U.S.C. 154(b) by 136 days.

(21) Appl. No.: 10/376,137

(22) Filed: Feb. 28, 2003

Related U.S. Application Data

(60) Provisional application No. 60/360,485, filed on Feb. 28, 2002.

(51) Int. Cl.[7] .............................. G02B 6/00; G02F 1/35; H01S 3/10; H01L 29/06; G01N 21/00
(52) U.S. Cl. .............................. 250/227.18; 250/227.11; 250/227.14; 250/227.17; 250/227.19; 250/227.23; 250/227.27; 250/227.28; 385/122; 359/326; 359/330; 359/332; 359/341.1; 359/341.2; 359/341.3; 359/341.31; 359/349; 359/350; 359/351; 359/352; 359/497; 359/498; 359/499; 359/500; 359/501; 372/20; 372/21
(58) Field of Search ...................... 250/227.11–227.28, 250/207–214.1; 257/183–201

(56) References Cited

U.S. PATENT DOCUMENTS

| | | | | | |
|---|---|---|---|---|---|
| 4,001,614 | A | * | 1/1977 | Dahlinger ................ 327/514 |
| 5,768,297 | A | * | 6/1998 | Shor ...................... 714/763 |
| 5,929,982 | A | * | 7/1999 | Anderson ................ 356/73.1 |
| 6,057,541 | A | * | 5/2000 | Steenblik ................ 250/225 |
| 6,424,665 | B1 | * | 7/2002 | Kwiat et al. ............ 372/21 |
| 6,430,345 | B1 | | 8/2002 | Dultz et al. |
| 6,444,999 | B1 | * | 9/2002 | Tomita .................... 257/14 |
| 6,473,719 | B1 | * | 10/2002 | Steenblik ................ 702/181 |
| 6,501,591 | B1 | * | 12/2002 | Kumar et al. ............ 359/330 |
| 6,522,749 | B2 | * | 2/2003 | Wang ..................... 380/263 |
| 6,646,727 | B2 | * | 11/2003 | Saleh et al. ............ 356/73.1 |
| 2002/0030180 | A1 | | 3/2002 | Tomita |
| 2002/0106084 | A1 | * | 8/2002 | Azuma et al. .......... 380/263 |
| 2002/0190249 | A1 | * | 12/2002 | Williams et al. ........ 257/14 |
| 2002/0191176 | A1 | * | 12/2002 | Saleh et al. ............ 356/73.1 |
| 2003/0055513 | A1 | * | 3/2003 | Raussendorf et al. ...... 700/1 |
| 2003/0067011 | A1 | * | 4/2003 | Ando et al. ............ 257/186 |
| 2003/0086138 | A1 | * | 5/2003 | Pittman et al. .......... 359/108 |

OTHER PUBLICATIONS

Kumar et al., "Fiber–Optic Sources of Quantum Entanglement", http://arxiv.org/abs/quant–ph/0209112.*
Tomita, "Complete Bell state measurement with controlled photon absorption and quantum interference", http://arxiv.org/abs/quant–ph/0006093 v1.*

(Continued)

Primary Examiner—John R. Lee
Assistant Examiner—Bernard Souw
(74) Attorney, Agent, or Firm—Reinhart Boerner Van Deuren s.c.

(57) ABSTRACT

A source and/or method of generating quantum-correlated and/or entangled photon pairs using parametric fluorescence in a fiber Sagnac loop. The photon pairs are generated in the 1550 nm fiber-optic communication band and detected by a detection system including InGaAs/InP avalanche photodiodes operating in a gated Geiger mode. A generation rate>$10^3$ pairs/s is observed, a rate limited only by available detection electronics. The nonclassical nature of the photon correlations in the pairs is demonstrated. This source, given its spectral properties and robustness, is well suited for use in fiber-optic quantum communication and cryptography networks. The detection system also provides high rate of photon counting with negligible after pulsing and associated high quantum efficiency and also low dark count rate.

45 Claims, 16 Drawing Sheets

OTHER PUBLICATIONS

Resch et al., "Practical creation and detection of polarization Bell states using parametric down-coversion", http://arxiv.org/abs/quant-ph/0204034 v2.*

Dehaene et al., "Local Permutations of products of Bell States and Entanglement Distillation", http://arxiv.org/abs/quant-ph/0207154 v1.*

Bartlett, Stephen, "Entanglement and Quantum Teleportation", Lecture 2 on Quantum Computing, NITP Summer School 2003, Adelaide. Australia, Jan. 28–31, 2003.*

Lamas-Linares et al., "Stimulated emission of polarization-entangled photons", Letters to Nature, Nature 412 (2001) 887–890.*

Wegner, Daniel, "Sagnac-Effekt", http://www.physik.fu-berlin.de/~wgnerd/diplomarbeit-www/node25.html.*

Ribordy et al., "Performance of InGaAs/InP avalanche photodiodes as gated-mode photon counters", Applied Optics 37/37/12 (1998) 2272–2277.*

Bthune et al., "An Autocompensating Fiber-Optic Quantum Cryptography System Based on Polarization Splitting of Light", IEEE J. Quant. Electronics 36/3 (2000) 340–347.*

Namekata et al., "Single-photon detector for long-distance fiber-optic quantum key distribution", Opt. Lett. 27/11 (2002) 954–956.*

Tomita et al., "Balanced, gated-mode photon detector for quantum-bit discrimination at 1550 nm", Opt. Lett. 27/20 (2002) 1827–1829.*

Tanzilli et al., "Highly efficient photon-pair source using periodically poled lithium niobate waveguide", Electron. Lett. 37/1 (2001) 26–28.*

Bonfrate et al., "Parametric fluorescence in periodically poled silica fibers", Appl. Phys. Lett. 75/16 (1999) 2356–2358.*

Ou et al., "Evidence of phase memory in two-photon down conversion through entanglement with the vacuum", Phys. Rev. A 41/1 (1990) 566–568.*

Kwiat et al., "Ultrabright source of polarization-entangled photons", Phys. Rev. A 60/2 (1999) R773R776.*

Clauser et al., "Proposed experiment to test local hidden-variable theories", Phys. Rev. Lett. 23/15 (1969) 880–884.*

Xiang et al., "Wavelength Shift Keying Technique to Reduce Four-Wave Mixing Crosstalk in WDM", 1999 IEEE Lasers & Electro-Optics Society Annual Meeting Proceedings, Paper WZ2, pp. 609–610, San Francisco, CA, Nov. 1999.*

Hedekvist, P.O. "Optical Phase Conjugation and All-Optical Demultiplexing using Four-Wave Mixing in Dispersion Shifted Fibers", http://www2.lib.chalmers.se/cth/doc/9798/HedekvistPerOlof.html.*

C.E. Kuklewicz F. Kesklner, F.N.C. Wong, .I H. Strapiro, *A high for entanglement source based on a doubly resonant optical parametric amplifier*, J Opt H-Quantum G O 4(3): Mar. 2002, pp. 162–168.

I. J. Wang, C.K. Hong, S. R. *Generation of correlated photons via four wave mixing in optical fiber*. J Opt B-Quantum G O (3): Mar. 2001, pp. 346–362.

* cited by examiner

ALL-FIBER PHOTON-PAIR SOURCE FOR QUANTUM COMMUNICATIONS

CROSS-REFERENCE TO RELATED APPLICATION

This application claims priority of U.S. provisional application No. 60/360,485, which was filed on Feb. 28, 2002. +gi

STATEMENT REGARDING FEDERALLY SPONSORED RESEARCH

The United States Government has certain rights to this invention pursuant to Grant Nos. DAAD19-00-1-0469 and DAAD19-00-1-0177 from the Army Research Office and Grant No. N00014-91-J-1268 from the Office of Naval Research, all to Northwestern University.

BACKGROUND OF THE INVENTION

This invention relates to optical communications systems, and more particularly, to a fiber-based apparatus and method for producing and/or detecting quantum correlated pairs of photons that can be manipulated to obtain various forms of entanglement, such as polarization entangled photons.

Efficient generation and transmission of quantum-entangled photon pairs, especially in the 1550 nm fiber-optic communication band, is of paramount importance for practical realization of quantum communication and cryptography protocols. The workhorse source employed in all implementations thus far has been based on the process of spontaneous parametric down-conversion in second-order ($\chi^{(2)}$) nonlinear crystals. Such a source, however, is not compatible with optical fibers as large coupling losses occur when the pairs are launched into the fiber. This severely degrades the entangled photon-pair rate coupled into the fiber, since the rate depends quadratically on the coupling efficiency. From a practical standpoint it would be advantageous if a photon-pair source could be developed that not only produces photons in the communication band but also can be efficiently spliced to standard telecommunication fibers. Over the past few years, various attempts have been made to develop more efficient photon-pair sources, but all have relied on the aforementioned $\chi^{(2)}$ down-conversion process. Of particular note, one such prior art attempt used the effective $\chi^{(2)}$ of periodically-poled silica fibers.

Counting single photons at the fiber telecom wavelengths of 1.3 $\mu$m and 1.5 $\mu$m poses significant problems for research, communications, and metrology applications. Single photon detection has been done either with photomultiplier tubes (which have low repetition rate and very low quantum efficiency) or with avalanche photodiodes. Avalanche photodiodes temporarily bias the diode above the breakdown voltage of the diode, and an avalanche then occurs either due to thermally generated carriers (a "dark count") or from light generated carriers (a "light count"). The detector can be biased above breakdown until an avalanche occurs, then is reset. This method can either use active or passive quenching of the photodiode avalanche. There is a necessary inactive time after avalanche quenching needed for the electrons and holes to clear the diode. If the diode is reactivated before the avalanche clears, then the photodiode will breakdown from the carriers present from the previous avalanche. This afterpulsing limits the maximum rate that the diodes can be used at. Diodes can also be turned on at definite intervals. This is called gated-mode operation.

Detection of such short avalanches provides problems that were overcome in the 0.6 and 10 MHz systems. Due to capacitive coupling through the diode, there is a deterministic "ringing" output waveform that lasts for about the same time as the gate pulse. It is about 10–100 times larger than the avalanche. One known prior art system uses a pulse cancellation technique using reflected gate pulses. Another prior art system uses two diodes to obtain cancellation.

In light of the foregoing, it is an object of the present invention to provide a quantum/non-classical photon-pair source and/or method for such generation and transmission, overcoming various deficiencies and shortcomings of the prior art, including those outlined above.

Another object of the present invention is to provide a photon-pair source enhancing coupling efficiency and reducing coupling loss.

A further object of the present invention is to provide a photon-pair source and/or method of generation useful with standard telecommunication fibers.

A related object of the present invention is to provide a method of generating photon-pairs in useful communication bands, such bands as are compatible with a range of standard telecommunication fibers.

A further object of the present invention is to provide a method and/or apparatus useful therewith for the production of fluorescence photon pairs in a useful communication band.

Another object of the present invention, in accordance with one or more of the preceding objectives, is to provide an apparatus and/or source for the generation and/or transmission of photon pairs, such photon pairs as can be generated through use and employment of a suitable laser or incoherent pump of the sort or comparable to that described more fully below.

Yet another object of the present invention is to provide an apparatus, component and/or method of use for photon pair detection, such apparatus, component or associated method as can be utilized in accordance with various other aspects of this invention, including but not limited to a pulsed nature of the subject photon pairs.

Another object of the present invention is to provide a photon-pair source and/or method of generation useful for free space optics communication.

Another object of the present invention is to provide a photon-pair source and/or method of generation at any wavelength window from 0.4 microns to 2.0 microns through the use of a straight fiber or fiber Sagnac loop with dispersion zero in that window.

Another object of the present invention is to provide a source of multiple (at different wavelengths) photon-pair simultaneously and/or method of generation at any wavelength window from 0.4 microns to 2.0 microns through the use of a straight fiber or fiber Sagnac loop with dispersion zero in that window.

It is a further object of the present invention, alone or in conjunction with one or more of the preceding objectives, irrespective of apparatus or component used therewith, to provide a broad methodology for the generation of quantum-correlated photon pairs via fluorescent phenomena in the vicinity of the zero dispersion wavelength of fibers, such as the commercially-available dispersion-shifted fibers.

Other objects, features, benefits and advantages of the present invention will be apparent from this summary and the following descriptions of various preferred embodiments, and will be readily apparent to those skilled in the art having knowledge of various photon pair generation, quantum communication and/or encryption techniques. Such objects, features, benefits and advantages will be apparent from the above as taken in conjunction with the accompanying examples, data, figures and all reasonable inferences to be drawn therefrom.

References

The following background information together with other aspects of the prior art, including those teaching useful in light of the present invention, are disclosed more fully and better understood in light of the following.

1. P. G. Kwiat, E. Waks, A. G. White, I. Appelbaum, and P. H. Eberhard, "Ultrabright source of polarization-entangled photons," Physical Review A, vol. 60, pp. R773–R776, August 1999.

2. G. Bonfrate, V. Pruneri, P. G. Kazansky, P. Tapster, and J. G. Rarity "Parametric fluorescence in periodically poled silica fibers," Applied Physical Letters, vol. 75, pp. 2356–2358, October 1999.

3. S. Tanzilli, H. De Riedmatten, W. Tittel, H. Zbinden, P. Baldi, M. De Micheli, D. B. Ostrowsky and N. Gisin, "Highly efficient photon-pair source using periodically poled lithium niobate waveguide," Electronics Letters, vol. 37, pp. 26–28, Janaury 2001.

4. Z. Y. Ou, L. J. Wang, X. Y. Zou, and L. Mandel, "Evidence for phase memory in two-photon down conversion through entanglement with the vacuum," Physical Review A, vol. 41, pp. 566, 1990.

5. J. F. Clauser, M. A. Horne, A. Shimony, and R. A. Holt, "Proposed experiment to test local hidden-variable theories," Physical Review Letters, vol. 23, pp. 880–884, 1969.

6. "Performance of InGaAs/InP avalanche photodiodes as gated-mode photon counters", Gregoire Ribordy, Jean-Daniel Gautier, Hugo Zbinden, and Nicolas Gisin, APPLIED OPTICS, Vol. 37, No. 12, y 20, April 1998, p. 2272.

7. "Balanced, gated-mode photon detector for quantum-bit discrimination at 1550 nm", Akihisa Tomita and Kazuo Nakamura, OPTICS LETTERS, Vol. 27, No. 20, Oct. 15, 2002, p 1827.

8. "An auto-compensating fiber-optic quantum cryptography system based on polarization splitting of light", D. S. Bethune and W. P. Risk IEEE J. Quant. Electron., Vol. 36, 340–347 (2002).

9. "Single-photon detector for long-distance fiber-optic quantum key distribution," Naoto Namekata, Yuuki Makino, and Shuichiro Inoue, Optics Letters, Vol. 27, No. 11, Jun. 1, 2002, p. 954.

SUMMARY OF THE INVENTION

At least in part, the present invention provides a photon-pair source based on the Kerr nonlinearity ($\chi^{(3)}$) of standard fiber. In accordance therewith, quantum-correlated photon pairs are observed and characterized in the parametric fluorescence of four-wave mixing (FWM) in dispersion-shifted fiber (DSF).

The present invention employs a photon counting system that operates at a higher rate than those created by known prior art systems. Reported repetition rates by other groups are currently limited to -approximately 100 kilohertz, while the system of the present invention operates at 0.588 and 10 megahertz. The key innovations are operation of the diodes at room temperature so that the afterpulsing is a negligible effect up until about 20 MHz, and the use of high voltage (10 V), one nanosecond or slightly shorter gate pulses to raise quantum efficiency and limit dark count rate. The system needs the high voltage, short gate pulses to work acceptably at room temperature.

DETAILED DESCRIPTION OF PREFERRED EMBODIMENTS

Figure 1:
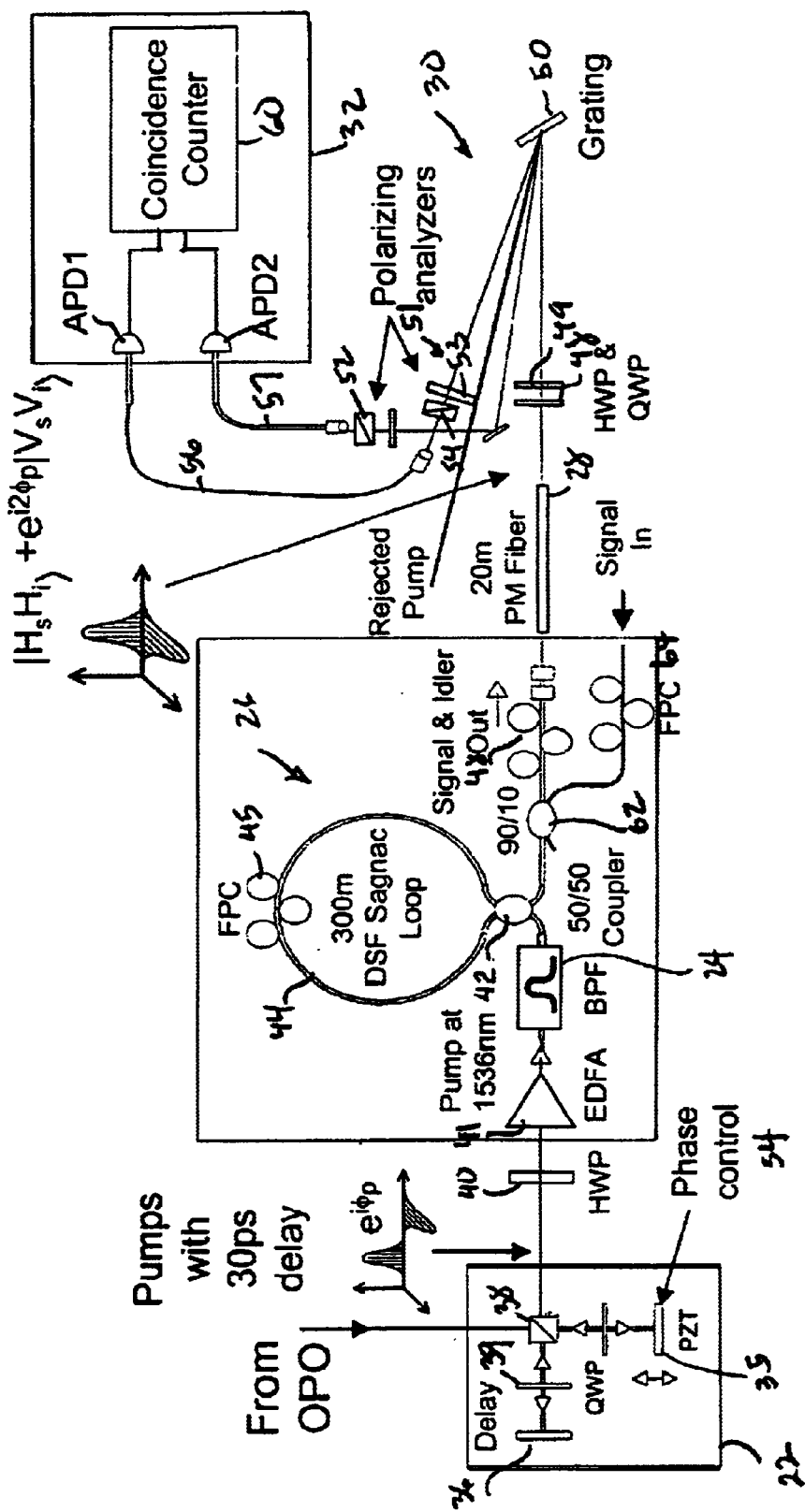
FIG. 1 is a schematic diagram of a system for the generation and detection of polarization-entangled photon pairs in accordance with the present invention.

Referring to FIG. 1, there is shown a schematic diagram of one embodiment of a system 20 for the generation and detection of polarization-entangled photon pairs in accordance with the present invention. The system produces polarization-entangled photon pairs by pumping a nonlinear-fiber Sagnac interferometer (NFSI) that effects a four-wave mixing (FWM) process with orthogonally polarized pulses. Two photon-pair production paths are required to create entanglement, each photon of the photon pair having a horizontal component and a vertical component. Both pump pulses see the same fiber and have identical paths. The all-fiber source of polarization-entangled photon pairs has particular application for implementing functions of quantum information processing and can be used in realizing complex networks involving more than one quantum processor and/or non-linear element. The entangled and/or quantum correlated pairs can be transmitted over fiber optic systems or they can be transmitted over free space land to land or land to satellite.

While certain embodiments of the present invention are described with reference to an application with communication media such as optical fiber, the present invention can provide a photon-pair source and/or method of generation useful for free space optics communication. Moreover, the present invention provides a photon-pair source and/or method of generation at any wavelength window from 0.4 microns to 2.0 microns through the use of a straight fiber or fiber Sagnac loop with dispersion zero in that window. The present invention provides a source of multiple (at different wavelengths) photon-pair simultaneously and/or method of generation at any wavelength window from 0.4 microns to 2.0 microns through the use of a straight fiber or fiber Sagnac loop, for example, with dispersion zero in that window.

More specifically, with reference to FIG. 1, the system 20 includes a phase/delay control 22, an input filter 24, a Sagnac loop 26, a delay component 28, free-space filters 30 and a detection circuit 32.

In one embodiment, the source of photons is an optical parametric oscillator. However, the source of photons can be any photon source that is tunable, allowing it to be set near zero dispersion wavelength of the fiber used for the Sagnac loop 26. The pump can be a continuous stream of photons as emitted by a continuous wave laser or a pulse of photons as emitted by a mode locked laser or any pulsed or incoherent pulse laser. For example, the source can be a 1536 nm fiber laser. In FIG. 1, the pump preferably provides a mode-locked train of pulses approximately 3 ps in duration and at a 75.3 MHz repetition rate. Signal photons and idler photons are generated at 1546 nm and 1526 nm, respectively, for a pump wavelength of 1536 nm. The pump wavelength can range from 0.4 microns to 2 microns, and can be in different communication bands, such as the 850 nm band, the 1300 nm band, the 1400 nm band, the 1550 nm or the 1600 nm band, for example.

The phase/delay control 22 includes a phase control component 34 and a delay component 36 and a polarization beam splitter 38 which splits an input pump pulse into two pluses and recombines them after a delay. The phase control component 22 provides coarse and precise tuning to provide a precise phase adjustment of the photon-pair production paths for true entanglement. Precisely tuned phase control is provided by the phase control component 34 which includes a mirror on a piezoelectric transducer (PZT) 35 and a quarter wave plate (QWP). The PZT 35 is swept by an applied voltage to provide submicron resolution in its position. This establishes a precise relative phase and delay between the two pulses, producing horizontally and vertically polarized pump pulses with relative phase and delay. The delay component 36 includes a mirror on a translation stage, and a quarter wave plate (QWP) 39 that is used to provide a preselected delay (longer than the pulse width) between the two pulses. The delay adjustment is accounted for by the delay removal component 28 located downstream as is discussed below. The pulses are time delayed to allow the pulses to traverse the Sagnac loop back-to-back. The signal and idler photons are produced at different wavelengths, allowing them to be separated by filtering.

The input filter 24, which is in the path of the pump photons, is a bandpass filter having a center frequency of 1536 nm and a 1 nm passband. The bandpass filter removes uncorrelated photons at the signal and idler wavelengths produced by the pump source from a majority of the pump photons to enhance the detectability of the polarization-entangled photons at the output of the Sagnac loop 26. By way of example, the bandpass filter 24 provides isolation equal to or greater than 35 dB. A half wave plate (HWP) 40 and an amplifier 41 can be interposed between the output of the phase/delay control 22 and the input of the bandpass filter 24. The amplifier 41 can be an erbium-doped fiber amplifier used to boost the intensity of the optical signals being supplied to the Sagnac loop 26 through the bandpass filter.

In the embodiment of FIG. 1, the Sagnac loop 26 is formed by a fused-silica 50/50 fiber coupler 42 spliced to a fiber. The fiber can be a 300 meter dispersion-shifted fiber 44 having zero-dispersion wavelength $\lambda_0$=1536 nm. That is, the fiber has a zero-dispersion wavelength that is close to that of the pump wavelength. The loop 26 further includes a fiber polarization controller (FPC) 45. The Sagnac loop can be set as a reflector, with proper adjustment of the intra-loop fiber polarization controller (FPC), to yield a transmission coefficient<−30 dB. A further FPC 48 is provided at the output of the Sagnac loop 26 to allow adjustment to compensate for polarization/phase shift in the Sagnac loop 26 to make the output the same as at the input to the Sagnac loop 26. Moreover, by properly adjusting the parameter of the Sagnac loop 26, more than one pair of photons can be created. All photon pairs are equivalent and can be used in an equivalent manner. At least 99.9% of the pump photons at the output of the 50/50 coupler are reflected back to the Photon source.

In one embodiment, the delay removing component 28 comprises a length of polarization maintaining (PM) fiber. Alternately, an apparatus similar to phase control component 22 can be used to remove the delay. Similarly, a PM fiber can be used to introduce delay in place of phase control and delay 22. The PM fiber 28 transmits the pulse components from the Sagnac loop 26 to the detection circuit 32 at different rates along its two axes and is interposed in the signal path for substantially eliminating the delay between the time shifted components. In one embodiment, the PM fiber 28 is twenty meters in length.

In the system 20 illustrated in FIG. 1, the output filter 30 is a dual-band spectral filter based on a double-grating spectrometer. The free-space filters 30 include a primary diffraction grating 50 a pair of secondary gratings such as path of unassigned and idler photons and polarizing analyzers 51 and 52.

The primary diffraction grating 50 (for example, holographic with 1200 lines/mm) spatially separates the signal photons, the pump photons, and the idler photons. A secondary diffraction grating 50A, such as a pair of gratings in the path of the signal and idler photons, such as grating 53, (ruled, 600 lines/mm) live pump The polarizing analyzers 51 and 52 direct the signal photons at wavelength $\lambda_S$ and the idler photons at wavelength $\lambda_I$ scattered by the primary diffraction grating 50 to individual detectors APD1 and APD2, respectively, of the detection circuit 32, the outputs of which are applied to a coincidence counter 60.

In one embodiment, the detection circuit 32 includes a photon counting system that includes separate detectors APD1 and APD2, embodied as avalanche photodiodes (APD), for signal photons and idler photons. The APDs can be fiber-pigtailed InGaAS/InP avalanche photodiodes, such as the type Epitaxx EPM239BA.

Each polarizing analyzer, such as polarizing analyzer 51, includes a half wave plate (HWP) 53 and a polarizer 54. The signal and idler photons are then recoupled into fibers 56 and 57 which function as the output slits of the spectrometer for directing the signal and idler photons to the detectors APD1 and APD2. The polarizing analyzers 53 and 54 allow configuring the entanglement source of FIG. 1 for producing any of the four Bell states.

Figure 2:
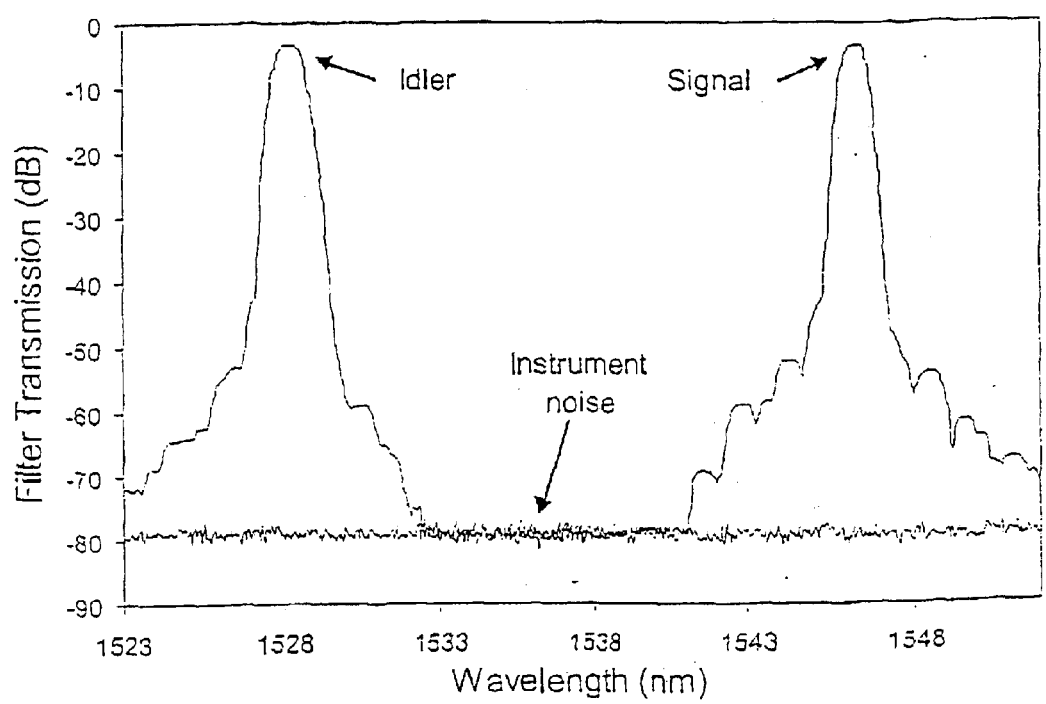
FIG. 2 are transmission curves of the signal and idler channels in the dual-band filter.
Figure 3:
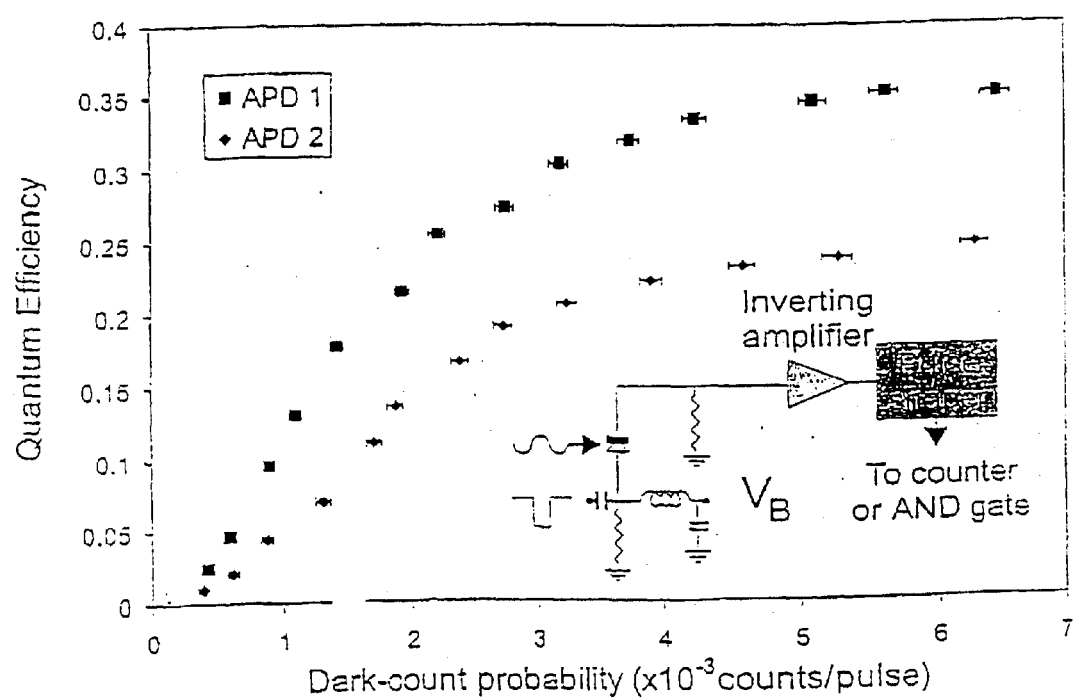
FIG. 3 is a graph of quantum efficiency as a function of dark-count probability for the two APDs used in the experiments.

Referring to FIG. 3, there is shown a graph of quantum efficiency vs. dark-count probability for the two avalanche photodiodes APD1 and APD2 of the system 20. A transmission spectrum of the dual-band filter, measured with a tunable source and an optical spectrum-analyzer (OSA), is shown in FIG. 2. The shape is Gaussian in the regions near the maxima of the two transmission bands, which are centered at 1546 nm (signal) and 1528 nm (idler), respectively, and the FWHM is ~0.46 nm. For pulse trains separated by 9 nm, which is the wavelength difference between the pump and the signal (or idler), this filter is able to provide an isolation $\geq 75$ dB; the measurement being limited by the intrinsic noise of the OSA. The combined effect of the Sagnac loop and the double-grating filter thus provides an isolation $\geq 105$ dB from the pump photons in the signal and idler channels. The maximum transmission efficiency in the signal channel is 45% and that in the idler channel is 47%. The total collection efficiency for the signal (idler) photons is thus 33% (35%), with inclusion of the losses in the Sagnac loop (18%) and at the 90/10 coupler (10%).

Illustrating by example, a detection component or aspect of this invention, the separated and filtered signal and idler photons are directed towards the APD1 and APD2. In recent years, the performance of InGaAs APDs as single-photon detectors for use in the fiber communication window around 1550 nm has been extensively studied by several groups. The pulsed nature of the photon pairs allows use of the APDs in a gated Geiger mode. In addition, the quality of such APDs permits room temperature operation with results comparable to those obtained by other groups at cryogenic temperatures.

The fiber-based apparatus 20 can also include a test input component 62 allowing injection of a small test signal via a 10/90 coupler 62 for test purposes. A FPC 64 allows adjustment to optimize the polarization of the test signal with respect to the polarization of the pump.

The following description illustrates how the nonlinear-fiber Sagnac interferometer (NFSI) and the four-wave mixing (FWM) process effected of the system 20 shown schematically in FIG. 1 function as an all-fiber source for generating quantum-correlated twin beams in optical fiber as described above, in FIG. 1 the pump is a mode-locked train of pulses approximately 3 ps in duration that arrive at a 75.3 MHz repetition rate. The pulsed operation serves two important purposes: i) the NFSI amplifier can be operated at low average powers (typical values are $\leq 2$ mW, corresponding to $\leq 9$W peak powers), and ii) the production of the fluorescence photons is confined in well-defined temporal windows, allowing a gated detection scheme to be used to increase the signal-to-noise ratio.

Whenever an injected pump wavelength is slightly greater than $\lambda_0$, the FWM in the DSF is phase matched. Two pump photons of frequency $\omega_p$ can scatter into a signal photon and an idler photon of frequencies $\omega_s$ and $\omega_i$, respectively, where $\omega_s + \omega_i = 2\omega_p$. Signal-Idler wavelength separations of ~20 nm can be easily obtained with use of commercially-available DSF.

The 10% (90/10) coupler 62 can be employed to inject a weak signal, which is parametrically amplified, and the output signal and the generated idler are used for alignment purposes. For the photon-counting measurements described herein, the input signal is blocked.

After passing through the 90/10 coupler 62, the fluorescence photons are directed towards the free-space filters that separate the signal photons and the idler photons from each other and from the pump photons. To measure the nonclassical (i.e., quantum) correlations between the signal and the idler photons, the pump photons are effectively suppressed by the double-grating spectrometer from reaching the detectors APD1 and APD2. Since a typical pump pulse contains ~$10^8$ photons and interest lies in detecting ~0.01photons/pulse, a pump-to-signal (idler) rejection ratio in excess of 100 dB is required.

With standard optical fiber serving as the transmission medium, technological synergy between the generation component and the other information processing components of the overall quantum network can be achieved by employing sources of entanglement that rely on the nonlinearity of the fiber itself. The parametric fluorescence accompanying four-wave mixing in the fiber's low-loss telecommunication band creates non-classically correlated signal and idler photon pairs. Such correlations can be exploited to generate polarization-entangled photon pairs. As will be shown, the system 20 can use the fiber-generated polarization-entangled photon pairs to create and detect the four "Bell states" in the 1550 nm wavelength region. Measurements show that a violation of Bell's inequality in excess of 2 σ is achieved. Delayed, orthogonally-polarized pump pulses (angular frequency, $\omega_p$) are injected into the Sagnac loop 26 from using a technique that allows for precise relative phase control between the two pump pulses. Within the Sagnac loop 26, spontaneously scattered signal-idler photons are created at a rate of ~0.1 pairs/pump pulse. The signal-idler angular frequencies follow $\omega_{s(i)} = 2\omega_p + (-)\Omega$, where $\Omega$ is determined by the phase matching condition for the four wave mixing interaction in the DSF. The generated pairs emerge from the Sagnac loop 26 and pass through the PM fiber 28 that removes the delay introduced at the input. At this point, the photons are in the polarization-entangled state given by $$|\psi\rangle = (1/\sqrt{2})[|H_s H_i\rangle + e^{i2\phi_p}|V_s V_i\rangle] \quad (1)$$

where H and V represent horizontally and vertically polarized photons, respectively, the subscripts "s" and "i" 0 indicate signal and idler, and $\phi_p$ is the relative phase between the horizontally and vertically polarized photons. The relative phase $\phi_p$ is controlled by adjusting the relative phase between the two pump pulses using the phase/delay control 34. The photon pairs are then separated from each other using a double-grating spectral filter, passed through polarizing analyzers, and counted using InGaAs APDs operated in the gated-Geiger mode. The overall detection efficiency for a given gate is 7–9%.

Figure 7:
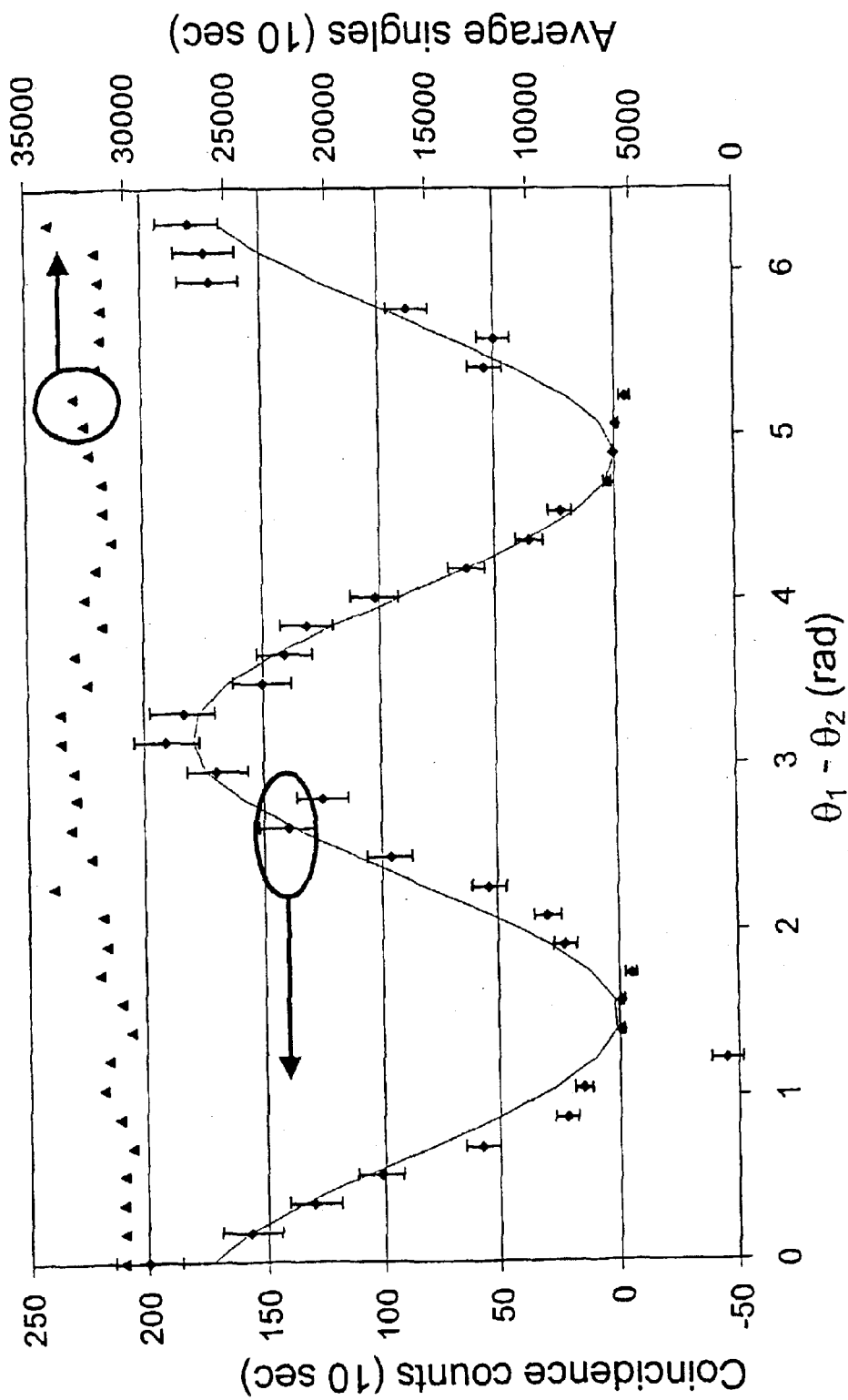
FIG. 7 is a plot of coincidence counts as a function of the relative angle between the polarization analyzers of the system of FIG. 1, with one of the polarization analyzers set at 45°.

The evidence of polarization entanglement is shown in FIG. 7. FIG. 7 is a plot of coincidence counts (with data points shown as diamonds) as a function of the relative angle between the two polarization analyzers with one analyzer set at 45°. The average single counts for the signal (or idler) photons also are shown (triangles, right axis). To obtain this curve, the relative phase difference between the pump pulses is set to zero, one of the polarizing analyzers 51 and 52 is set to 45°, and coincidence rates are measured as the relative angle between the two analyzing polarizers is changed. The visibility of the resulting fringe pattern is ~95%. The single count rates are also monitored and vary by only ~10%. The coincidence counting time is 10 seconds or each pair of angle settings, $\theta_s$, and $\theta_i$, of the analyzing polarizers.

TABLE 1

Angle settings of the analyzing polarizers

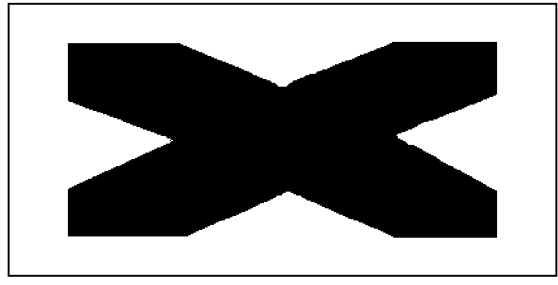

FIG. 7 illustrates the results of measurements of coincidence counts that shows a violation of Bell's inequality. In taking the measurements, the coincidence counting time was ten seconds for each pair of angle settings of the analyzing polarizers. When the relative phase difference between the two pump pulses is zero, by recording the coincidence counts for the 16 combinations of analyzer settings given in Table 1, a preliminary result of 2.5±0.25 is obtained for the Clauser-Horne-Shimony-Holt (CHSH) form of Bell's inequality [5]. This corresponds to a violation of the CHSH inequality by two standard deviations.

Figure 8:
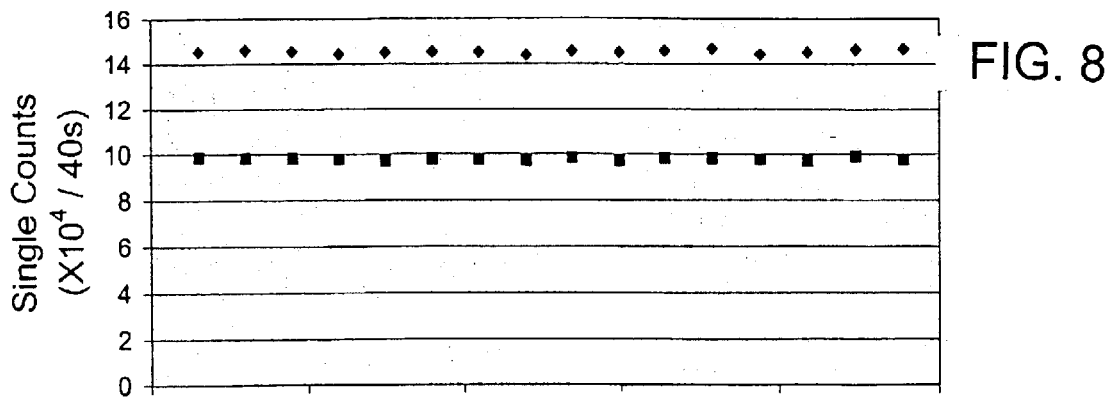
FIG. 8 is a plot of single-photon counts registered by the signal and idler detectors of the system of FIG. 1 as the phase between the two pump pulses is varied.

FIG. 8 is a plot of single-photon counts registered by the signal and idler detectors of the system 20 of FIG. 1 as the phase between the two pump pulses is varied. No phase dependence is observed in the single count rate of either detector.

Figure 9:
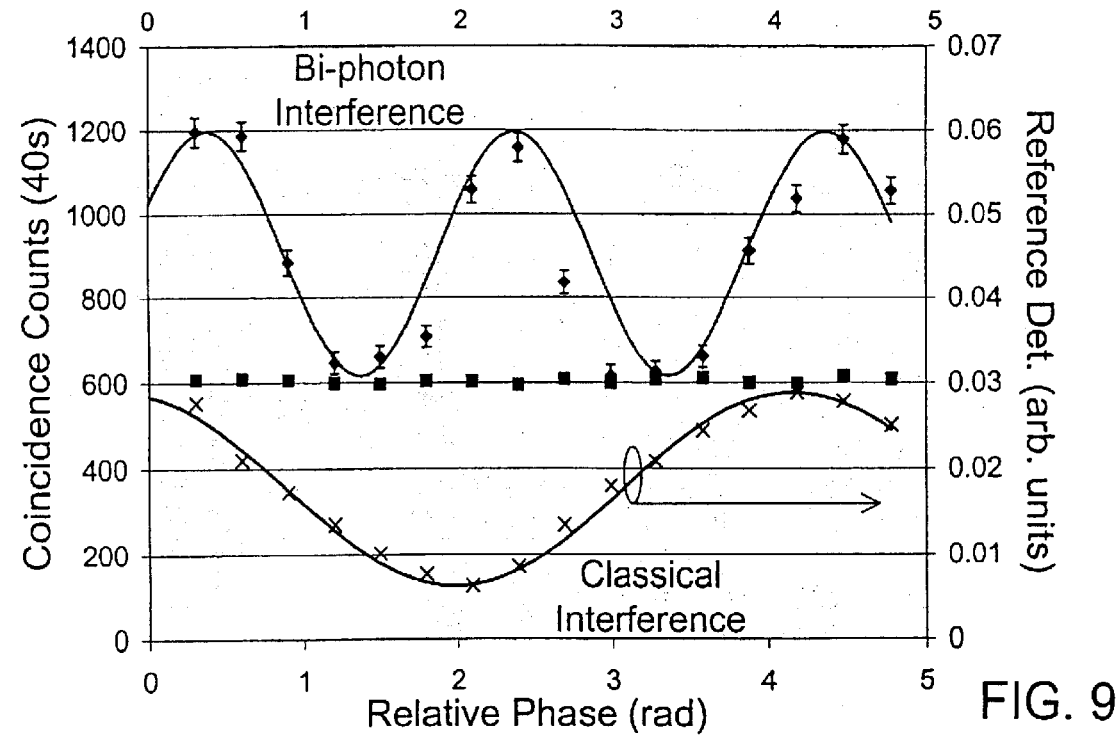
FIG. 9 is a plot of coincidence-photon counts registered by the signal and idler detectors of the system of FIG. 1 as the phase between the two pump pulses is varied.

FIG. 9 is a plot of coincidence-photon counts registered by the signal and idler detectors of the system 20 of FIG. 1 as the phase between the two pump pulses is varied. The "squares" represent accidental coincidences that are measured due to less-than-unity detection efficiency and dark counts in the detectors. After subtraction of the accidental counts, the resulting fringe visibility is >90%. The period of the fringes is half that of the classical interference fringes (represented by the crosses and using the right scale in FIG. 9) which were simultaneously monitored by a reference detector during the coincidence measurements. The solid lines are best fits to the expected sinusoidal dependencies.

It is pointed out that while in the examples used for describing the invention, the photons are described as being in the polarization-entangled state given by the relationship $|H_s H_i\rangle + e^{i2\phi_p}|V_s V_i\rangle$. However, the phase controller 34 and HWP 53 are set as a function of which Bell state is to be produced. Thus, depending upon these settings, the system 20 can produce and detect any one the four. Bell polarization-entangled states, namely:

$$|H_s H_i\rangle + |V_s V_i\rangle \quad (2)$$

$$|H_s V_i\rangle + |V_s H_i\rangle \quad (3)$$

$$|H_s H_i\rangle - |V_s V_i\rangle \quad (4)$$

$$|H_s V_i\rangle - |V_s H_i\rangle \quad (5)$$

Figure 10:
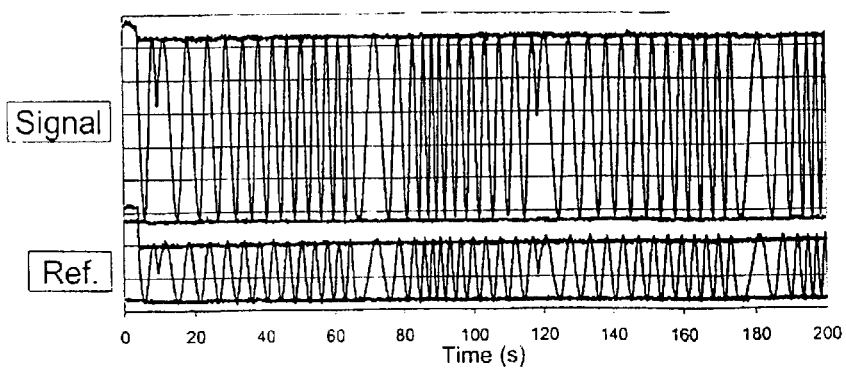
FIG. 10 are waveforms illustrating the mechanical and phase stability of the system of FIG. 1 over a ten minute period.

Precise control of the parameter $\phi_p$ is essential for proper operation. To achieve the required measure of control a reference beam is introduced, via the 10% (90/10) coupler 62, which is set to a wavelength different from that of the to pump, signal, and idler. Classical interference on the reference beam is monitored simultaneously as photon counting measurements are being made to verify that $\phi_p$ is properly set to 0 or $\pi/2$ and does not change during the course of the measurement. This technique relies on the fact that the phase of the reference beam is identical to that of the signal and idler photons. In FIG. 10, the classical interference as $\Phi_p$ is varied on the weak signal used for alignment purposes is compared with that of the reference beam and they are seen to overlap. During photon counting measurements the weak alignment signal is blocked but the reference beam is on.

EXAMPLES OF THE INVENTION

The following non-limiting examples and data illustrate various aspects and features relating to the sources, apparatus and/or methods of the present invention, including the generation and/or transmission of non-classical photon pairs, as available through the inventive apparatus and methodology described herein. In comparison with the prior art, the present sources, methods and/or apparatus provide results and data which are surprising, unexpected and contrary to the prior art. While the utility of this invention is illustrated through the use of selected apparatus and components thereof, it will be understood by those skilled in the art that comparable results are obtainable with various other apparatus, devices and/or components thereof, in accordance with the methodologies described, as are commensurate with the scope of this invention. Moreover, although the following results are provided for the system 20 shown in FIG. 1, comparable results are available for the systems 80, 100 and 140 shown in FIGS. 11, 12 and 14, for example.

EXAMPLE 1

FIG. 3 shows a plot of the quantum efficiency versus the dark-count probability for the two avalanche photodiodes APD1 and APD2 used in the system 20. A figure-of-merit for the APDs can be introduced through the noise-equivalent power $(NEP)=(h\nu/\eta)(2R_D)^{1/2}$, where h is the Planck constant, ν is the frequency of light, η is the detector quantum efficiency, and $R_D$ is the dark-count rate measured during the gate time. The best values of NEP obtained by optimizing $V_B$ are $1.0 \times 10^{-15}$ W/Hz$^{-1/2}$ for APD1 and $1.6 \times 10^{-15}$ W/Hz$^{-1/2}$ for APD2. These values are comparable to those reported for cryogenically-cooled APDs. Under the optimized conditions, the efficiency of APD1 (APD2) is 25% (20%) and the corresponding dark-count probability is $2.2 \times 10^{-3}$/pulse ($2.7 \times 10^{-3}$/pulse).

EXAMPLE 2

Figure 5:
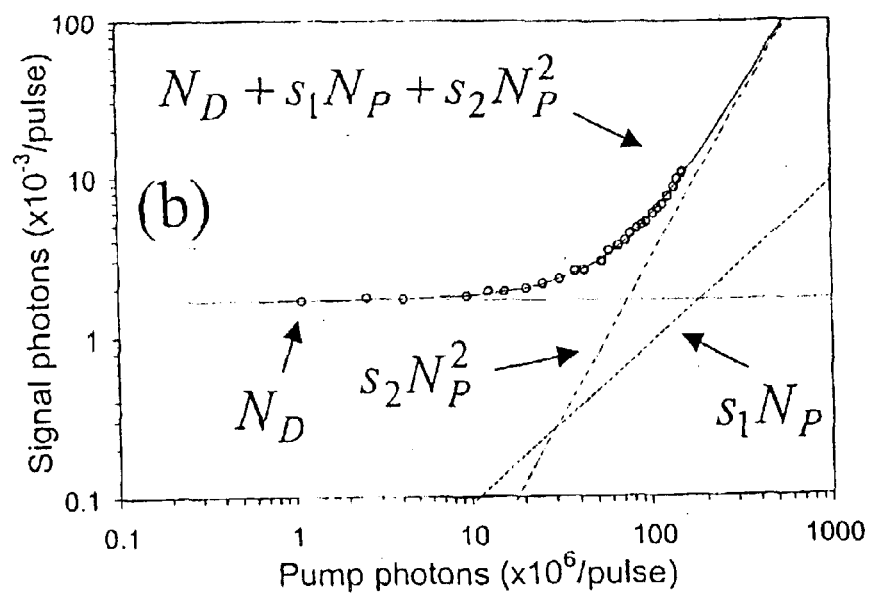
FIG. 5 is a graph showing detected idler photons as a function of the injected pump photons for the system of FIG. 1 with the input filter.
Figure 6:
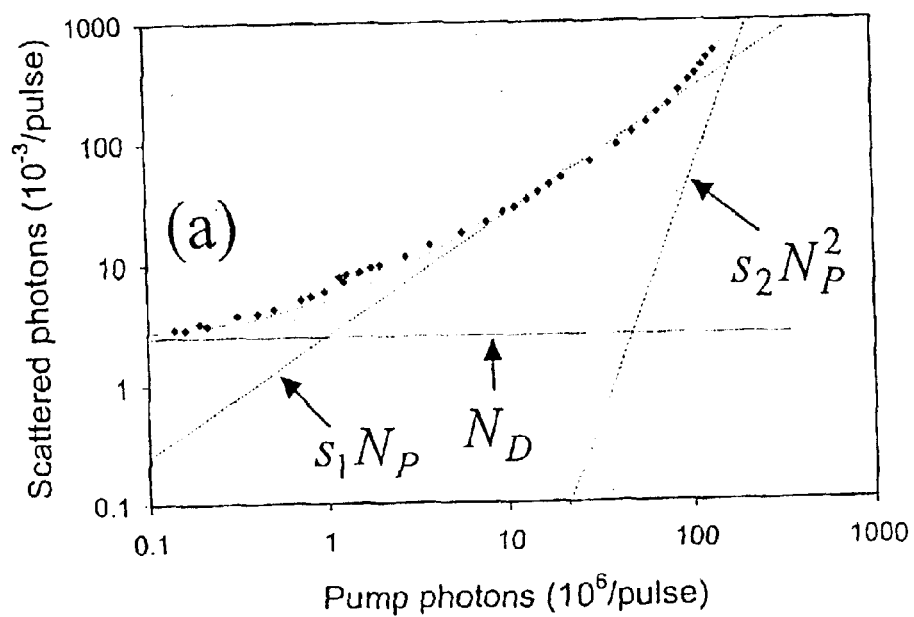
FIG. 6 is a graph showing detected idler photons as a function of the injected pump photons for the system of FIG. 1, but without the input filter.

As a first test of the inventive photon-pair source, and of the filtering process, the number of scattered photons detected in the signal (idler) channel, $N_S$ ($N_I$), were measured as a function of the number of pump photons, $N_p$, injected into the NFSI. The results for the idler channel are shown in FIG. 5. With the pre-filtering provided by bandpass filter 24, the single photon scattering rate can be made to depend quadratically on the input pump photon number $N_p$. The experimental data fits with $N_s = N_D + S1 N_p + S2 N_p^2$, where $N_D$ is the number of dark counts during the gate interval, and S1 and S2 are the linear and quadratic scattering coefficients, respectively. The fit clearly shows that the quadratic scattering owing to FWM in the fiber can dominate over the residual linear scattering of the pump due to imperfect filtering. Without pre-filtering, the single photon scattering rate cannot be made to depend quadratically on the input pump photon number $N_p$ as shown in FIG. 6.

EXAMPLE 3

Figure 4:
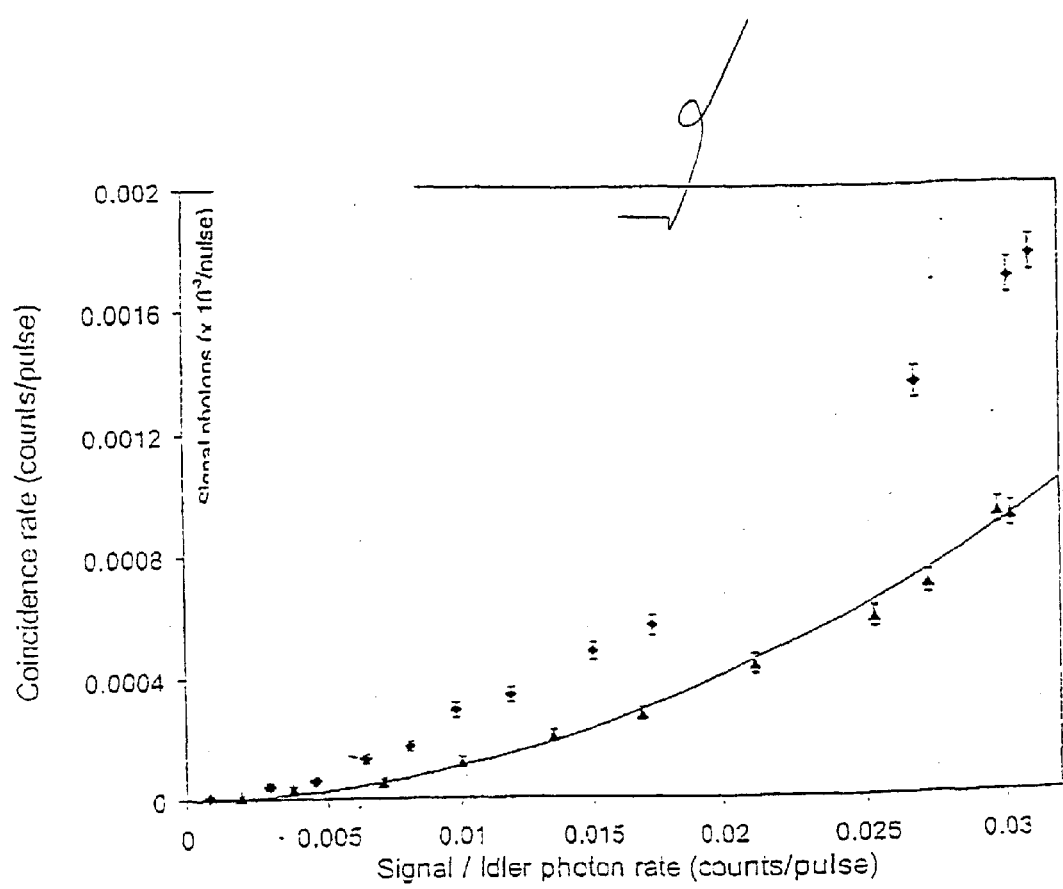
FIG. 4 is a plot of coincidence rates as a function the single-photon rates in two different cases; for signal-idler fluorescence produced by a pump pulse and signal-idler fluorescence produced by two consecutive pump pulses.

FIG. 4 is a plot of coincidence rates as a function the single-photon rates in two different cases; for signal-idler fluorescence produced by a pump pulse (for which the data points are shown as diamonds) and signal-idler fluorescence produced by two consecutive pump pulses (for which the data points are shown as triangles). The line represents the calculated "accidental" counts.

The diamonds represent the rate of coincidence counts as a function of the rate of the signal and idler photons generated during the same pump pulse. For convenience, the coincidence rate is plotted as a function of the geometric mean of the signal and idler count rates. In fact, since the efficiency of the two detectors is different, different single-photon count rates in the two channels are measured. Dark counts have been subtracted from the plotted count rates. For the coincidence rates, both dark-dark and photon-dark coincidences have to be taken in account, but for the counting rates in our experiment the former are negligible. A maximum coincidence rate of $10^3$ counts/s (=coincidence rate/ pulse×gate-pulse rate) has been achieved. This rate can be increased at least a factor of ten by using a higher repetition-rate gate-pulse generator.

Two independent experiments were performed to demonstrate the nonclassical nature of the coincidences. Results of the first experiment are shown by the triangles in FIG. 4, which represent the measured coincidence rate as a function of the signal-photon count rate when the signal is delayed with respect to the idler by one pulse period. The delay was achieved by inserting a fiber patch-cord of appropriate length in the signal path from the output of the filter to APD1. For two independent photon sources, each with a count rate $R_S \ll 1$, the "accidental" coincidence rate $R_C$ is given by $R_C = R_S^2$, regardless of the photon statistics of the sources. This quadratic relation is plotted as the solid line in FIG. 4, which fits the delayed-coincidence data (triangles) very well. These measurements then show that while the fluorescence photons produced by the adjacent pump pulses are independent, those coming from the same pump pulse show a strong correlation, an indication of their nonclassical behavior.

EXAMPLE 4

In the second experiment, measurements were performed to demonstrate the nonclassicality test.

It can be shown that the inequality $$R_C - R^{(a)}_C - 2(R_{S/2} - R^{(a)}_{S/2} + R_{I/2} - R^{(a)}_{I/2}) \leq 0 \qquad (6)$$

is valid for two classical light sources, where $R_c$ is the coincidence-count rate for the two sources, $R^{(a)}_c$ is the calculated "accidental" coincidence-count rate corresponding to the same photon-count rate for the two sources, $R_{S/2}$ and $R_{I/2}$ are the coincidence-count rates measured by passing the light from each of the two sources through a 50/50 splitter and detecting the two halves independently, and $R^{(a)}_{S/2}$ and $R^{(a)}_{I/2}$ are the calculated "accidental" coincidence-count rates in the 50/50 splitting measurements. Using the experimental data, Equation (1) yields $(64\pm9) \times 10^{-6} \leq 0$, where the error is statistical. The inequality for classical sources is thus violated by over seven standard deviations.

Figure 11:
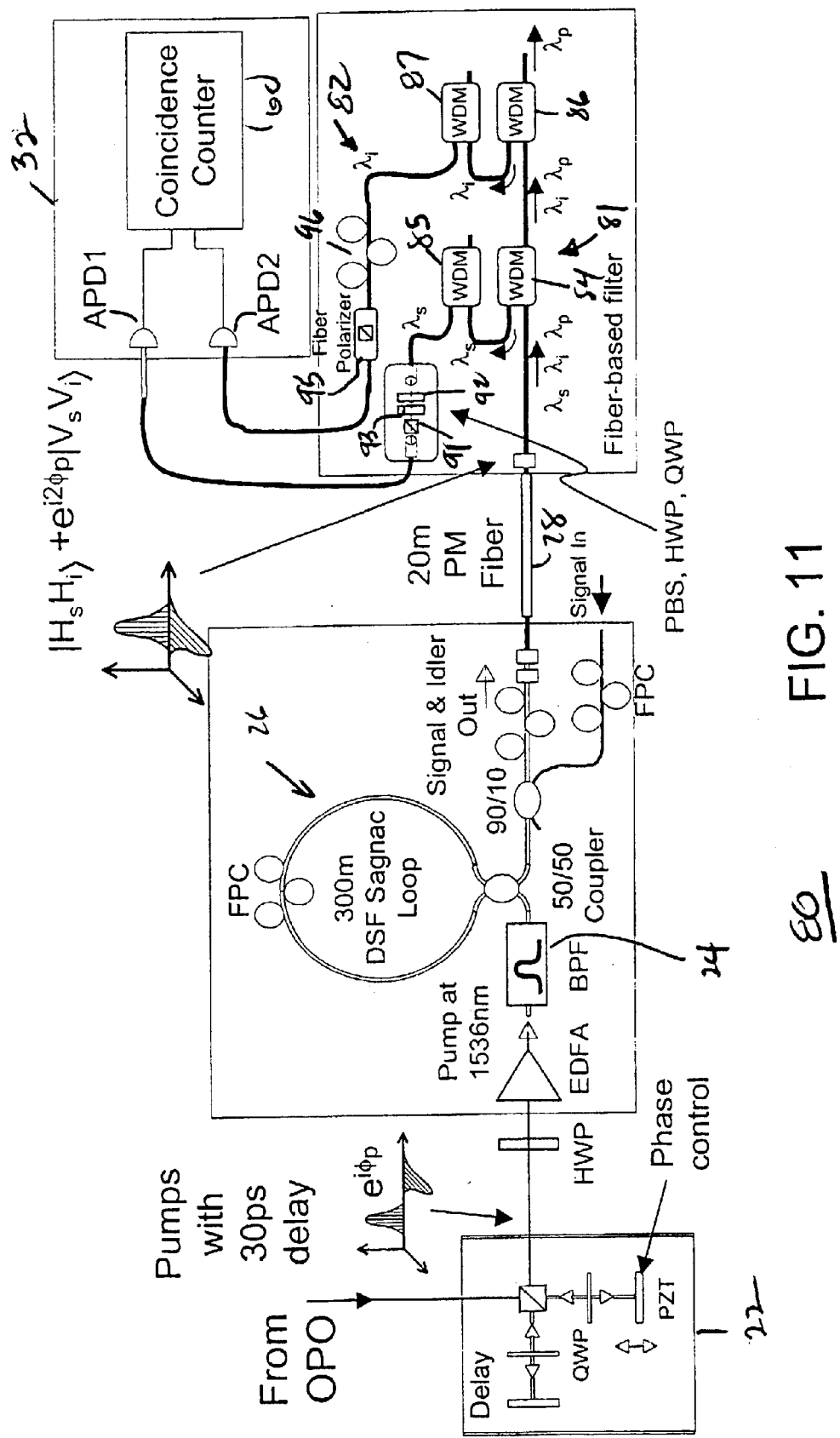
FIG. 11 is a schematic diagram of a system for the generation and detection of polarization entangled pairs of photons in accordance with a second embodiment of the invention.

FIG. 11 (Fiber-based Filter)

Referring to FIG. 11, there is shown a schematic diagram of a system 80 in accordance with another embodiment of the invention. The system 80 is similar to system 20 and accordingly, components of system 80 have been given the same reference numbers as like or similar elements of system 20. System 80 includes a phase/delay control 22, an input filter 24, a Sagnac loop 26, and a delay component 28. The system 80 differs from system 20 in that system 80 includes a fiber-based filter 81. The fiber-based filter 81 uses wavelength division multiplexing, and the filter is wavelength dependent. The fiber-based filter 81 is comprised of wavelength division multiplexers (WDM). Because of the number of the photons at the pump signal wavelength $\lambda_p$, two stages of WDM are used both for the signal photon path and the idler photon path. Thus, the signal photon path includes WDM 84 and WDM 85 and the idler photon path includes WDM 86 and WDM 87. By way of example, WDM can reduce the number of pump photons contained in the signal from about $10^8$ down to about $10^4$. Thus, the signal provided at the output of WDM 84 can include pump photons at wavelength $\lambda_p$, the majority of which are rejected by WDM 85. Similarly, the signal provided at the output of WDM 86 can include pump photons at wavelength $\lambda_p$, the majority of which are rejected by WDM 87.

Moreover, the detection circuit 32 and fiber based filter 82 are fixed to detect a preselected Bell state, unlike the detection circuit for system 20 shown in FIG. 1. System 80, as illustrated, is configured for detection of a fixed polarization for the idler photon with the polarization of the signal photon being variable. The system can be aligned to obtain to a polarization-entangled state given by $|\psi\rangle = (1/\sqrt{2}) |H_s H_i\rangle + e^{i 2\phi_p} |V_s V_i\rangle$. If a different Bell state is desired, the half wave plate 93 is changed accordingly.

The portion of the detection 32 and fiber based filter circuit 82 that detects the signal photons at wavelength $\lambda_s$ includes a polarizing beam splitter (PBS) 91, a half wave plate (HWP) 93 and a quarter wave plate (QWP) 92. The portion of the detection circuit 32 and fiber based filter 82 that detects the idler photons at wavelength $\lambda_i$ includes a fiber polarizer 95 and a fiber polarization controller (FPC) 96.

Figure 12:
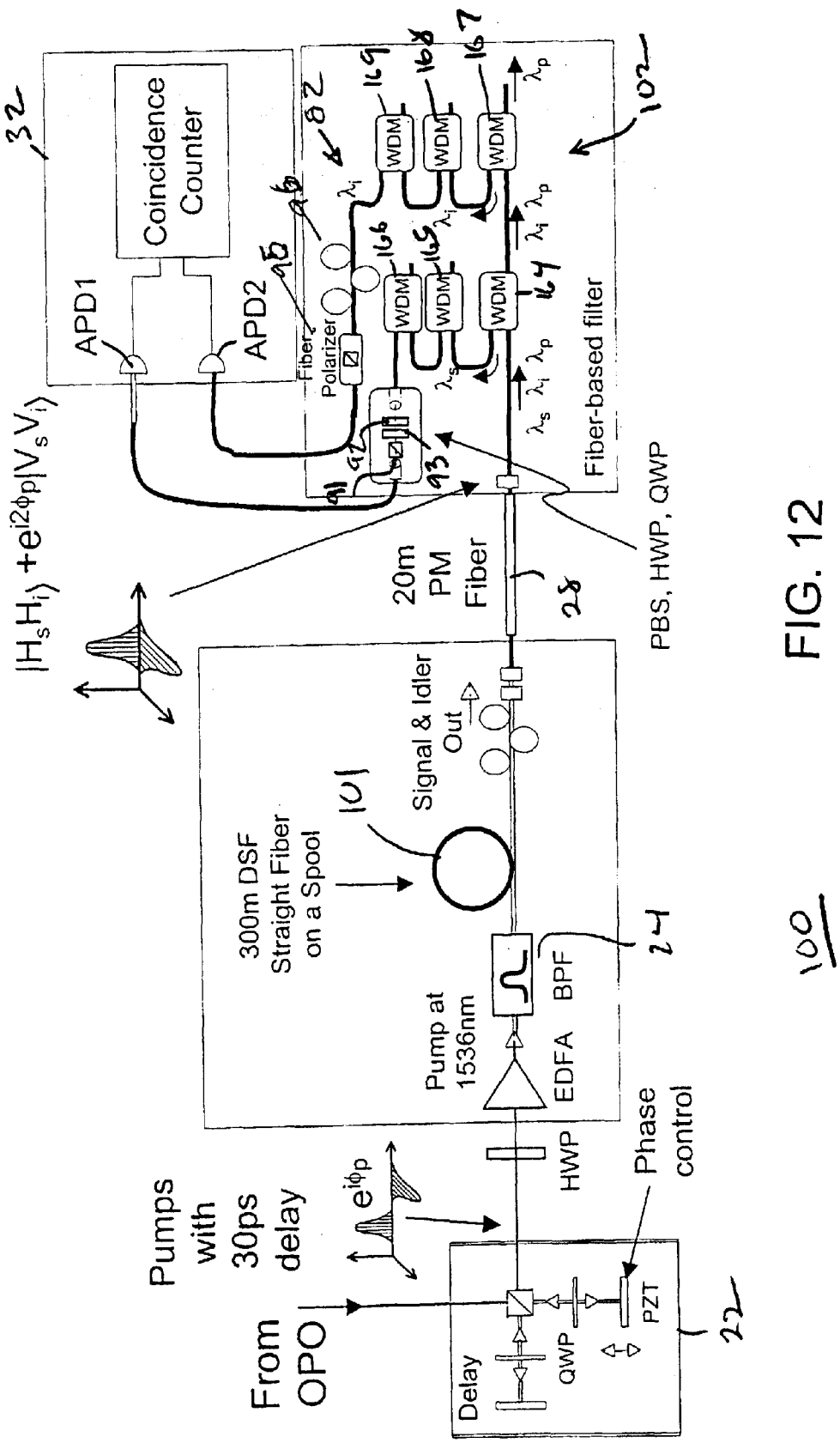
FIG. 12 is a schematic diagram of a system for the generation and detection of polarization-entangled photon pairs in accordance with a third embodiment of the invention.

FIG. 12 (Without the Sagnac Loop)

Referring to FIG. 12, there is shown a schematic diagram of a system 100 in accordance with another embodiment of the invention. The system 100 is similar to system 80 shown in FIG. 11, and accordingly, components of system 100 have been given the same reference numbers as like or similar elements of system 80. System 100 includes a phase/delay control 22, an input filter 24, a delay component 28 and detection circuit 82. The system 100 differs from system 80 in that system 100 includes a straight fiber 101 and the fiber-based filter 102 includes three tandem stages of wavelength division multiplexing. Thus, portion of the fiber-based filter 102 that detects the signal photons at wavelength $\lambda_s$ includes WDM 164, WDM 165 and WDM 166, the output of which is applied through HWP 92 and QWP 93 to the input of polarizing beam splitter (PBS) 91. Similarly, the portion of the fiber-based filter 102 that detects the idler photons at wavelength $\lambda_i$ includes WDM 167, WDM 168 and WDM 169, the output of which is applied through FPC 96 to the input of fiber polarizer 95.

The straight fiber is connected between the output of the bandpass filter and the FPC. The additional wavelength division multiplexing stages are provided to compensate for the attenuation provided by the Sagnac loop in the system 80.

Figure 13:
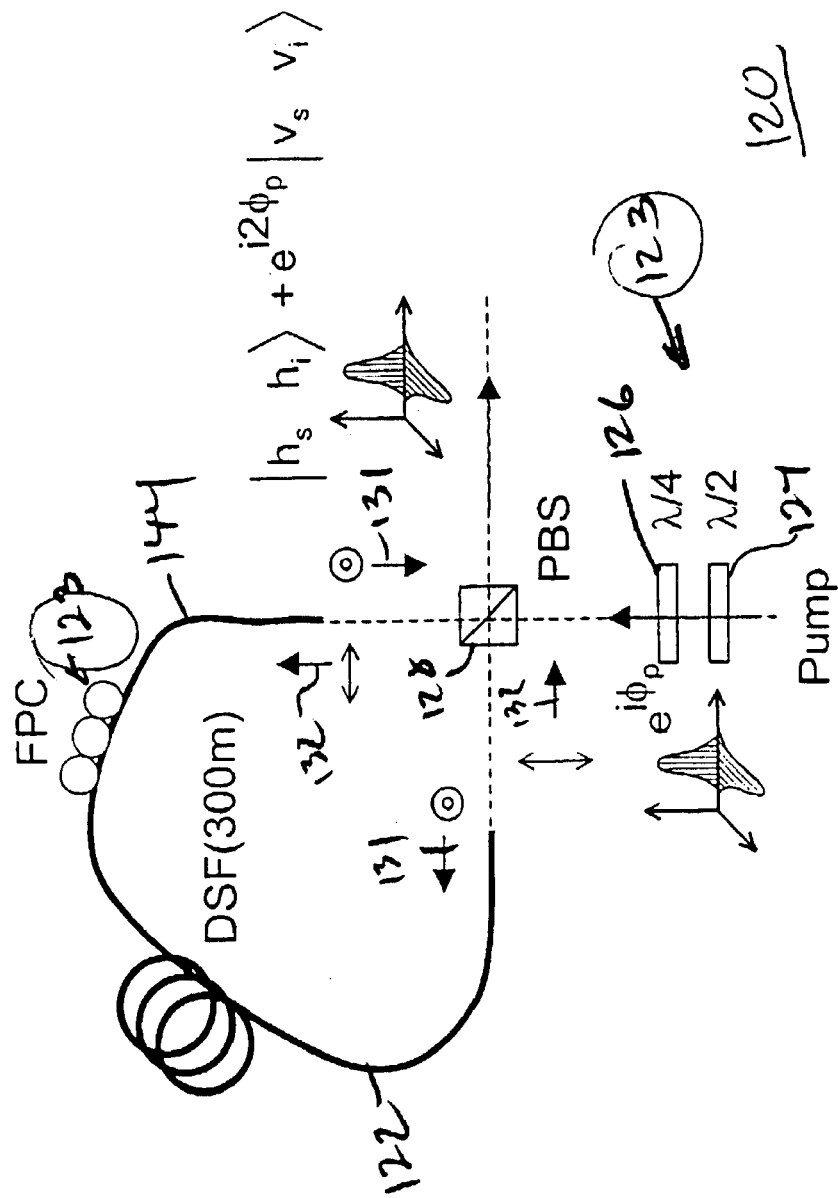
FIG. 13 is a schematic diagram of apparatus for generating polarization-entangled photon pairs with a single pump pulse in accordance with the invention.

FIG. 13 (Apparatus with Counter-propagating Signals)

Referring to FIG. 13, there is shown a schematic diagram of apparatus 120 for producing polarization-entangled photons in accordance with a further embodiment of the invention. The apparatus 120 differs from the apparatus of the systems 20, 80 and 100 (FIGS. 1, 11 and 12) in that rather than being time-shifted and being transmitted back-to-back through a dispersion-shifted fiber (DSF) 121, or Sagnac loop 26 as for systems 20 and 80 (or through a straight fiber loop 102 as for system 100), the horizontal and vertical polarizations of the photon pairs are transmitted through a fiber loop in opposite directions, i.e., the horizontal and vertical components are counter-propagating signals. Also, a delay remove fiber is not needed at the output of the fiber loop.

The pulsed pump is directed through a phase control 123 which includes a half wave plate (HWP) 124 and a quarter wave plate (QWP) 126. The pump is then incident on a port of the PBS 128 that directs horizontal and vertical components into opposite ends of a 300 meter fiber 144 that includes a fiber polarization controller (FPC) 146. The DSF has a zero-dispersion wavelength $\lambda_0$=1536 nm. The HWP 124 and QWP 126 provide a relative phase difference between the horizontal and vertical polarization components. The PBS 128 splits the pulses into the horizontal and vertical polarizations which are conducted through the straight fiber loop in opposite directions as represented by the arrows 131 and 132, respectively. As is stated above, in this embodiment, the input circuit, including HWP 124, QWP 126 and PBS 128, does not provide time separation between the pulses.

The horizontal and vertical polarizations are recombined by the PBS 128 that outputs the resultant signal at the fourth port of the PBS 128. Photon pairs resulting from the phase matched FWM 122 are generated in each direction. Proper adjustment of the intra-loop FPC 123 allows most of the light to be directed out the fourth port of the PBS 128. In the limit of very low parameteric scattering in probability, the quantum state of the photon pairs corresponds to the polarization-entangled state given by $|H_s H_i\rangle + e^{i2\Phi p}|V_s V_i\rangle$.

Figure 14:
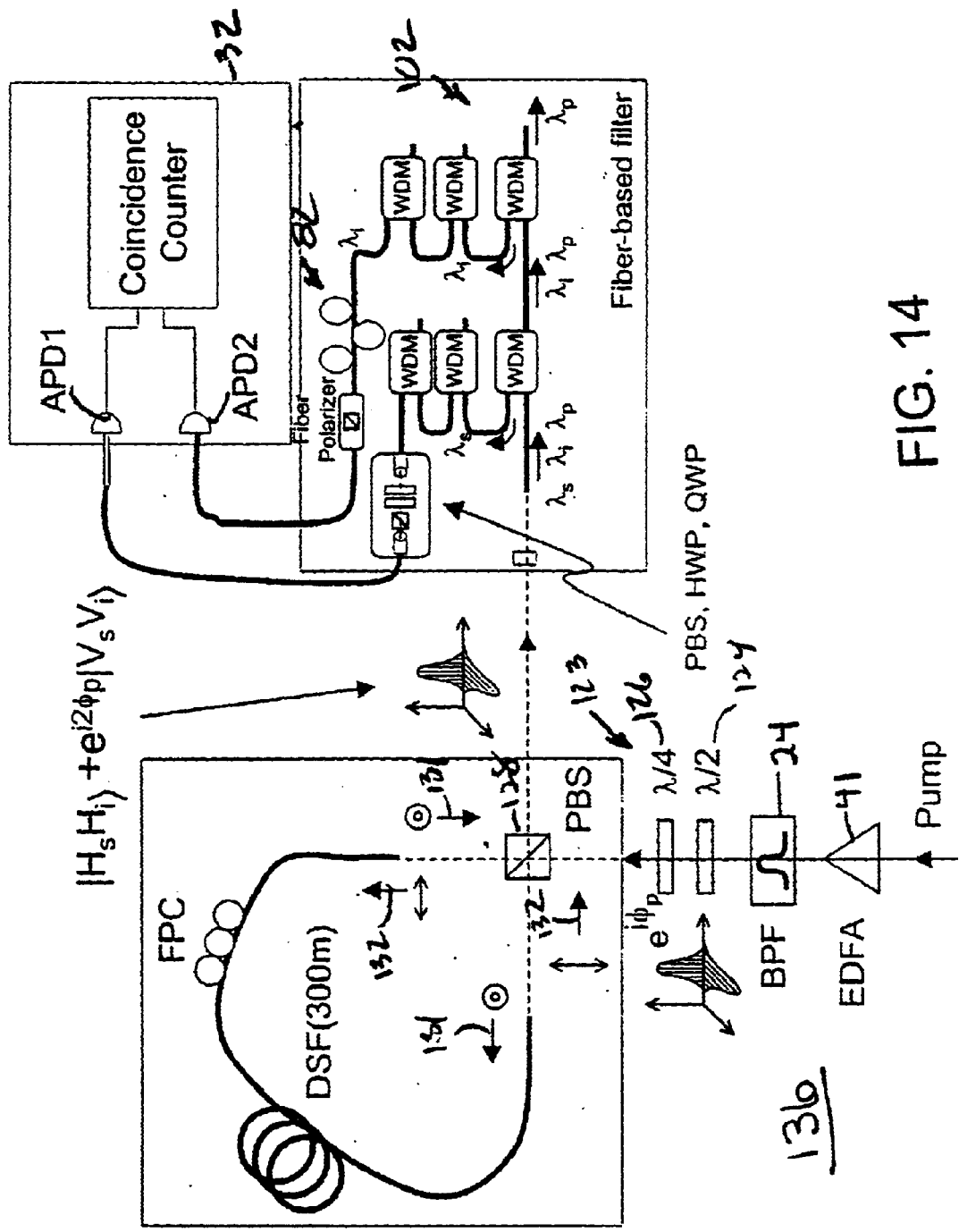
FIG. 14 is a schematic diagram of a system for the generation and detection of polarization-entangled photon pairs in accordance with a fourth embodiment of the invention.

FIG. 14 (System with Counter-propagating Signals)

Referring to FIG. 14, there is shown a schematic diagram of a system 136 for producing and detecting polarization-entangled photons in accordance with a further embodiment of the invention. The system 136 is similar to system 100 shown in FIG. 12, and incorporates the apparatus 120 of FIG. 13. Accordingly, components of system 136 have been given the same reference numbers as like or similar elements of system 100 and of apparatus 120.

System 136 includes a phase control 123, amplifier 41, an input filter 24, fiber-based filter 102 and detection circuit 32. The system 136 differs from the system 100 in that the system 136 includes the apparatus of FIG. 13, such that the horizontal and vertical components are counter-propagating signals.

The wave plates QWP 124 and HWP 126 allow adjustment in the relative polarization phase between the pulses to select one of the four Bell states. The pulses are split by the PBS 128 and in the example, vertical polarization goes CW (arrows 131) and horizontal polarization goes CCW (arrows 132). This generates a pulse pair (horizontal, vertical) in each direction. The two pulse pairs are not separated in time and the pulses traverse the same path but in opposite directions.

Figure 15:
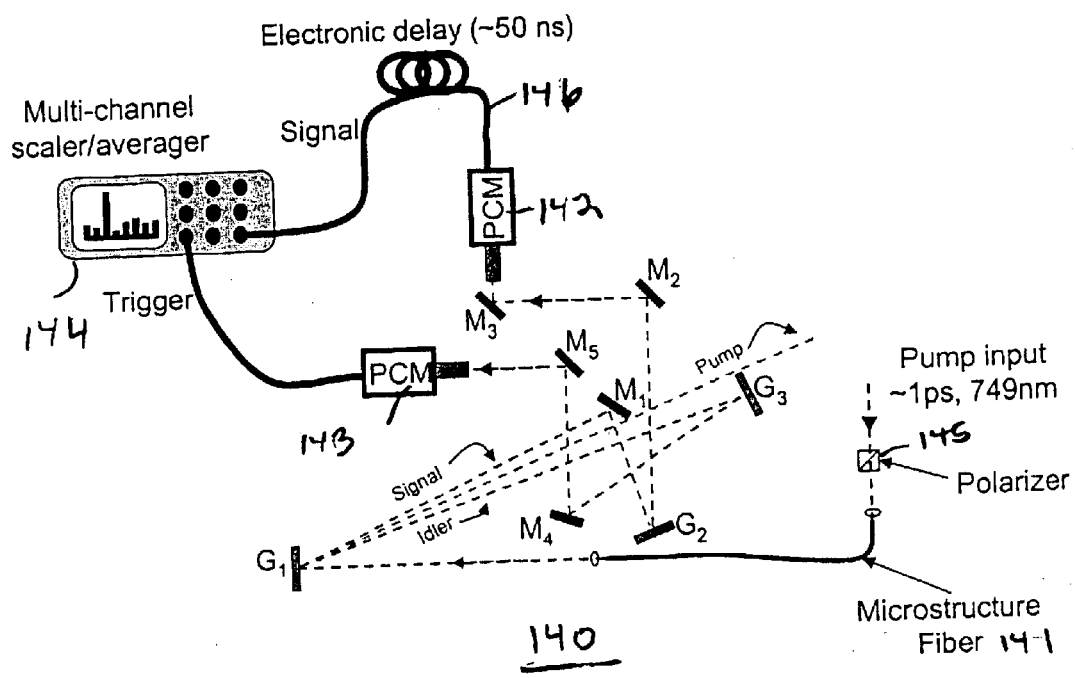
FIG. 15 is a schematic representation of a system for generating photon pairs using micro structure fiber in accordance with the invention.

FIG. 15 (Counter-propagating Signals Co-polarization w/o Entanglement

FIG. 15 is a schematic representation of a system 140 for generating co-polarized photon pairs in accordance with the invention. The system 140 can generate and detect quantum-correlated twin photons generated via the four-photon interaction in microstructure fiber (MF) 141.

In one embodiment, pump pulses of ~1 ps duration with a wavelength of 749 nm are injected into the MF with the light polarized along one of the birefringent axes of the fiber 141. Photon pairs emerge from the MF 141 accompanied by a very strong pump field (that is, a large number of pump photons). The wavelengths are separated using diffraction gratings G1–G3 (and mirrors M1–M5) and the signal and idler photons are directed through narrow slits onto photon counting modules 142 and 143 to which are directed the idler and signal photons, respectively. Interference filters are used to provide additional suppression of leaked pump photons. Coincidences are measured using a type SR-430 multi-channel scaler/averager 144 by using the output from one of the photon counting modules 142 or 143 as a trigger and the output of the other photon counting module as a signal source.

Figure 16:
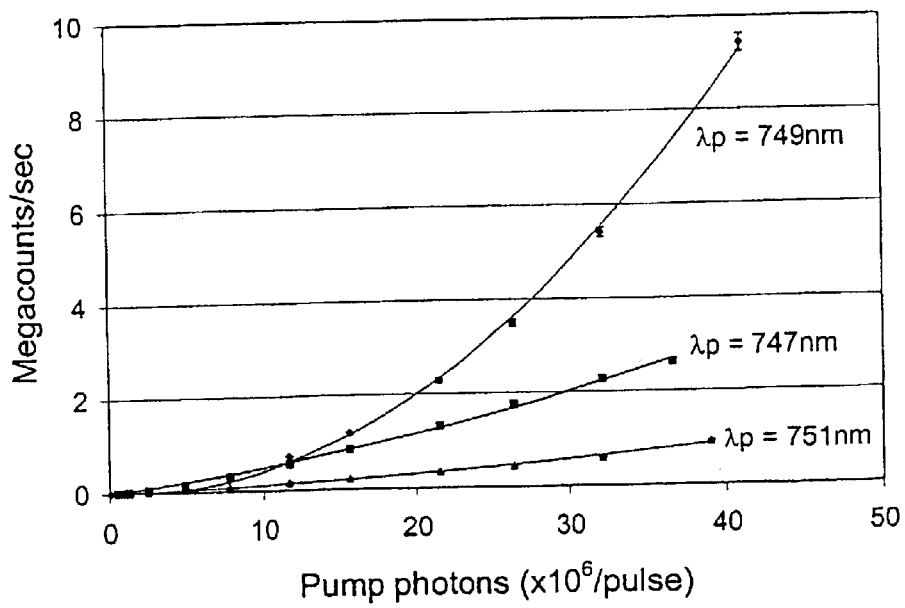
FIG. 16 is a graph with plots showing the effect of different pump wavelength for a given detection filter setting for the system of FIG. 15.

FIG. 16 is a graph including plots showing the effect of different pump wavelengths, 747 nm, 749 nm and 751 nm, for a given detection filter setting for the system 140 of FIG. 15. The plots show photon counts registered, data indicated by the symbols. The solid lines are fits to a second order polynomial) at the idler detector as a function of the number of pump photons per pulse for several different pump wavelengths.

Figure 17:
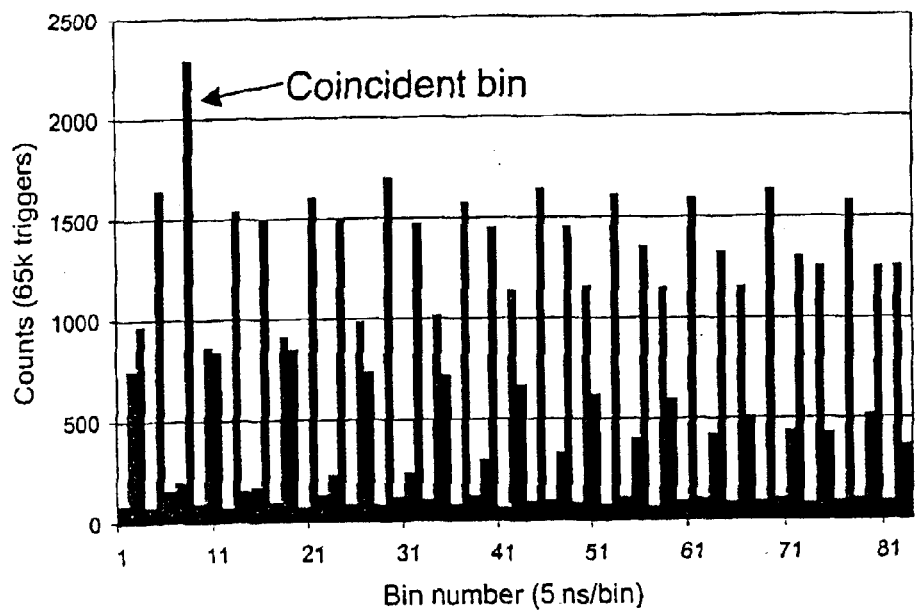
FIG. 17 is histogram data obtained using the scaler where one counter is used to trigger the acquisition and the other is taken to count the signal photons produced by the system of FIG. 15.

FIG. 17 illustrates histogram data obtained for the system 140 of FIG. 15 using the scaler 144, where one counter is used to trigger the acquisition and the other counter is taken to count the signal photons. One bin, the coincident bin, has many more counts than the others, indicating that the coincident events were registered at the photon-counting modules with a higher probability than non-coincident events.

Figure 18:
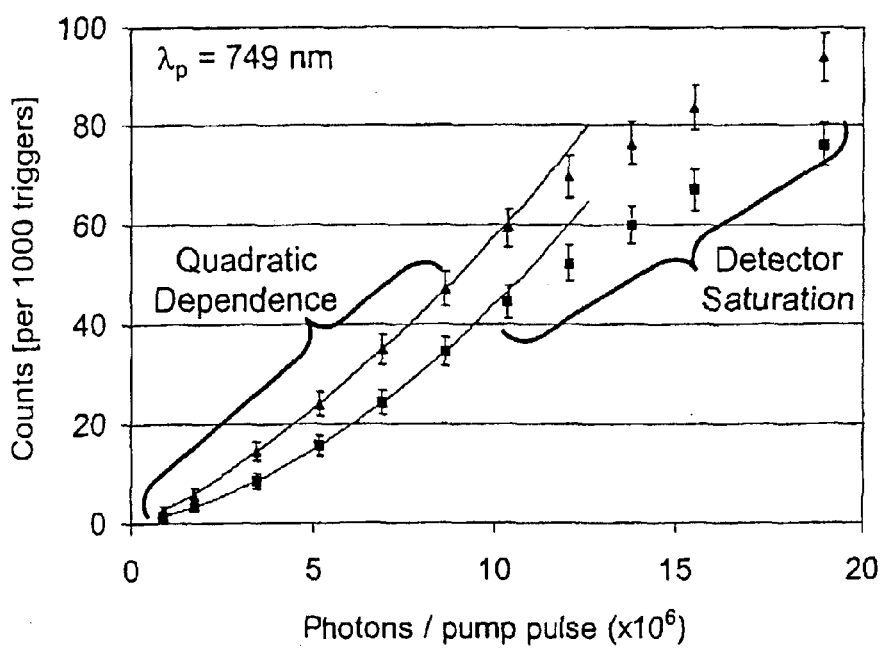
FIG. 18 is a graph with plots of coincidence counts and accidental counts as a function of the number of photons per pump pulse for the system of FIG. 15 and with the photon counters aligned to detect 737 nm and 761 nm.

FIG. 18 provides plots of coincidence counts (with data points shown as triangles) and accidental counts (with data points shown as boxes) as a function of the number of photons per pump pulse (pump wavelength of 749 nm) for the system 140 of FIG. 15, with the photon counters 146 and 147 aligned to detect wavelengths at 737 nm and 761 nm. At low pump powers there is a quadratic dependence of counts on the pump power. However, as the power is increased, the photon counters 143 and 144 become saturated. The fact that the curve for coincidences is higher than the background is evidence of the quantum correlated nature of the twin-photons emerging from the MF 141.

Figure 19:
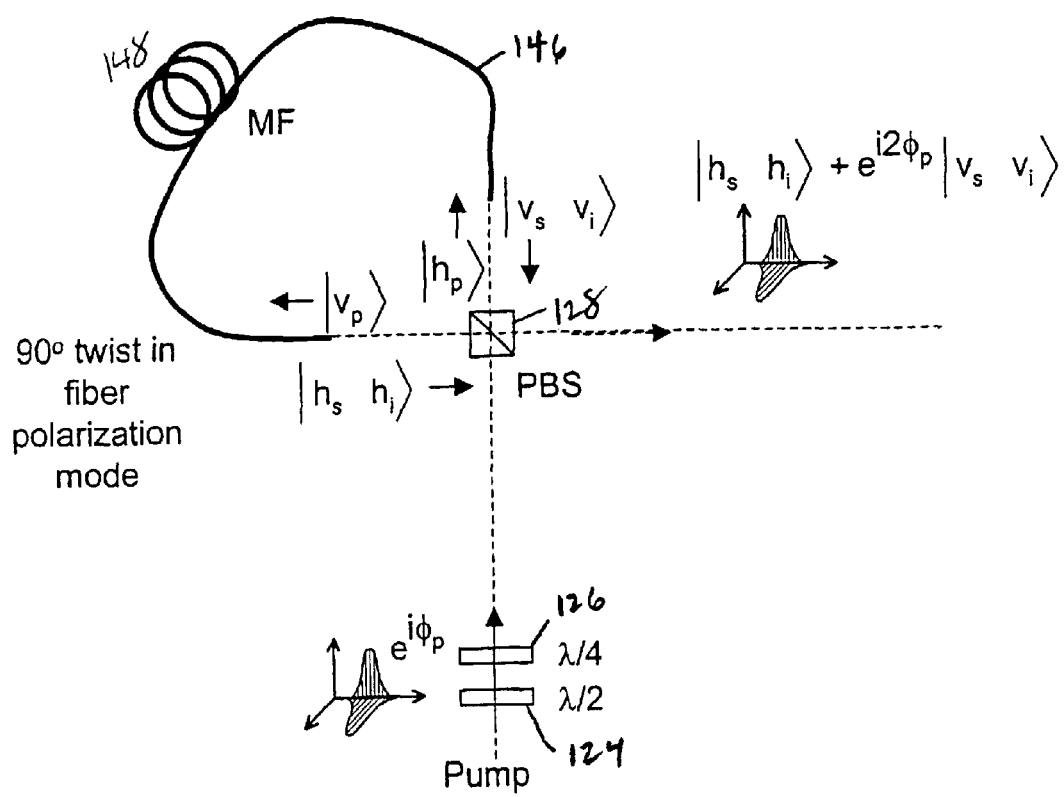
FIG. 19 is a schematic diagram of a further embodiment of the apparatus for generating polarization-entangled photon pairs from cross-polarized fluorescent photons with a single pump pulse in accordance with the invention.

FIG. 19, 90 Degree Twist—Entanglement

Referring to FIG. 19, there is shown a schematic diagram of an alternative apparatus for producing polarization-entangled photons using cross-polarized four-wave mixing (FWM) in a microstructure fiber (MF) 148 in accordance with a further embodiment of the invention. The apparatus differs from the apparatus 120 (FIG. 13) in that the MF incorporates a 90-degree twist in the alignment of the birefringent axes of the MF 148.

Pump pulses are incident on PBS 128 that directs vertically polarized light in the clockwise direction (arrows 131) while horizontally polarized light propagates in the counter-clockwise direction (arrows 132). By incorporating a 90-degree twist in the alignment of the birefringent axes of the MF 148, the signal and idler photons generated by cross-polarized FWM emerge in a polarization-entangled state. Signal and idler photons are then detected using a configuration similar to that shown for system 140 shown in FIG. 15, for example.

Detector Considerations

Figure 20:
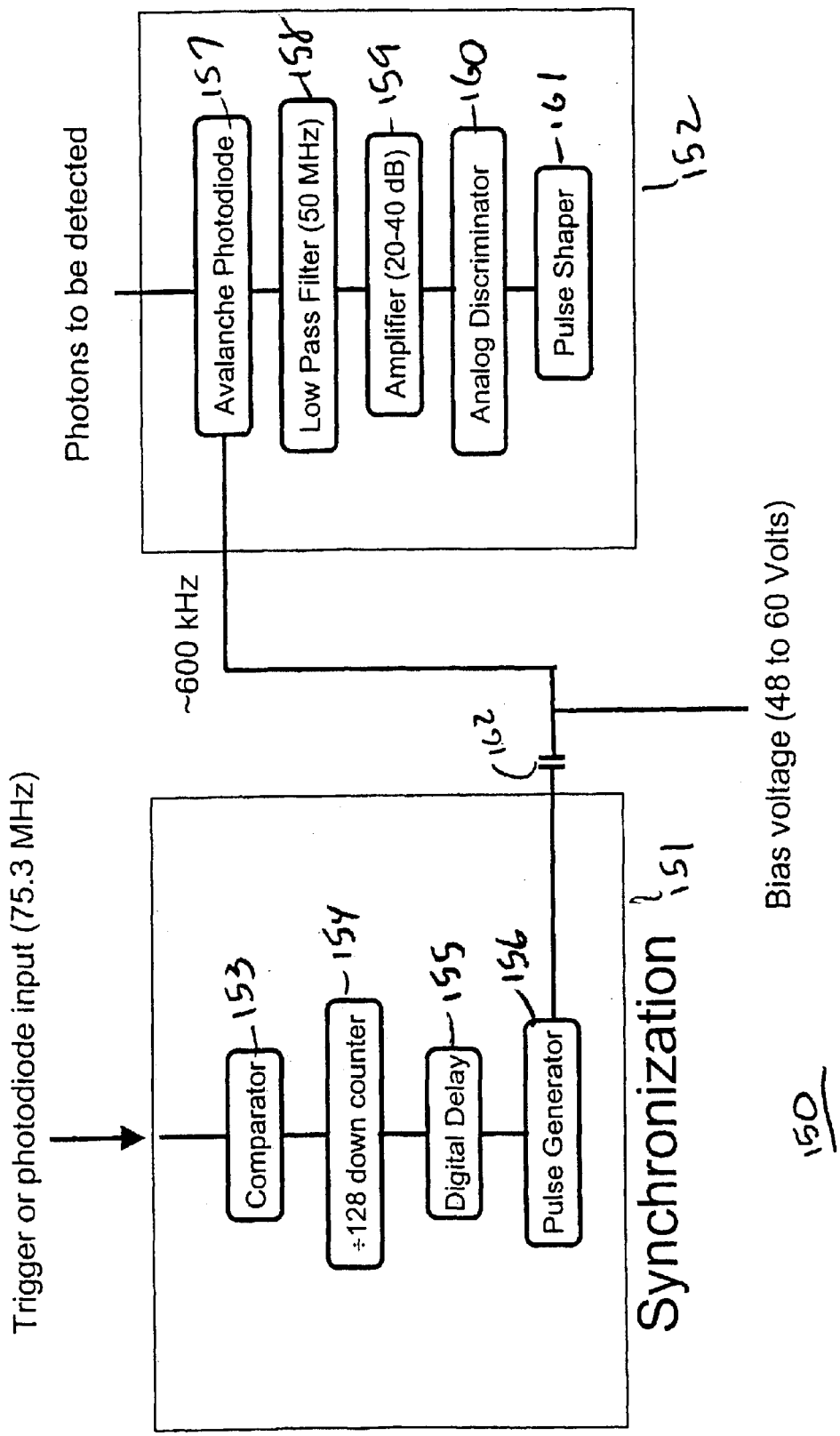
FIG. 20 is a block diagram of a photon counting system in accordance with the present invention.

Referring to FIG. 20, there is shown a photon counting system 150 which can be used in the detection 32 of systems 20 80, 120 and 140 illustrated in FIGS. 1, 11, 12 and 14, respectively. In the embodiment of the photon counting system 150 shown in FIG. 20. The photon counting system 150 includes a synchronization component 151 and a detection component 152. The synchronization component 151 includes a comparator 153, an optional frequency divider circuit 154, a digital delay circuit 155, and a pulse generator 156. The comparator allows for recovery of the optical clock frequency. The detection component 152 includes an avalanche photodiode 157, a low pass filter 158, an amplifier 159, an analog discriminator 160 and a pulse shaper 161.

The frequency divider circuit 154 divides the rate of the photodiode input at 75.3 MHz by "128" such that the photodiode detector 157 is gated once every "128" pump pulses, resulting in a pulse rate of 0.688 MHz. The digital delay 155 adjusts the timing of triggers to the pulse generator 156 such that electrical gate pulses overlap in time with the arriving single photon level optical pulses.

The photodiode 157 is operated in gated-mode to detect photons. A bias voltage of 40 to 70 volts is applied to the photodiode 157. The pulse generator 156 produces a gating pulse for the photodiode detector 157. The gating pulse is coupled through a capacitor 162 to a bias network for avalanche photodiode 157. The bias network applies a bias voltage, slightly below the avalanche breakdown voltage, to the photodiode and the gate pulse brings the photodiode into the breakdown region.

The low pass filter 158 has a cutoff frequency of 50 MHz. The amplifier 159 can be a DC to 50 MHz amplifier with a 20 to 40 dB gain. The analog discriminator 160 signals with a voltage whether or not a detection event has occurred. The pulse shaper 161 reshapes the pulses into 500-ns wide TTL pulses that can be individually counted or sent to a TTL AND gate for coincidence counting.

Figure 21:
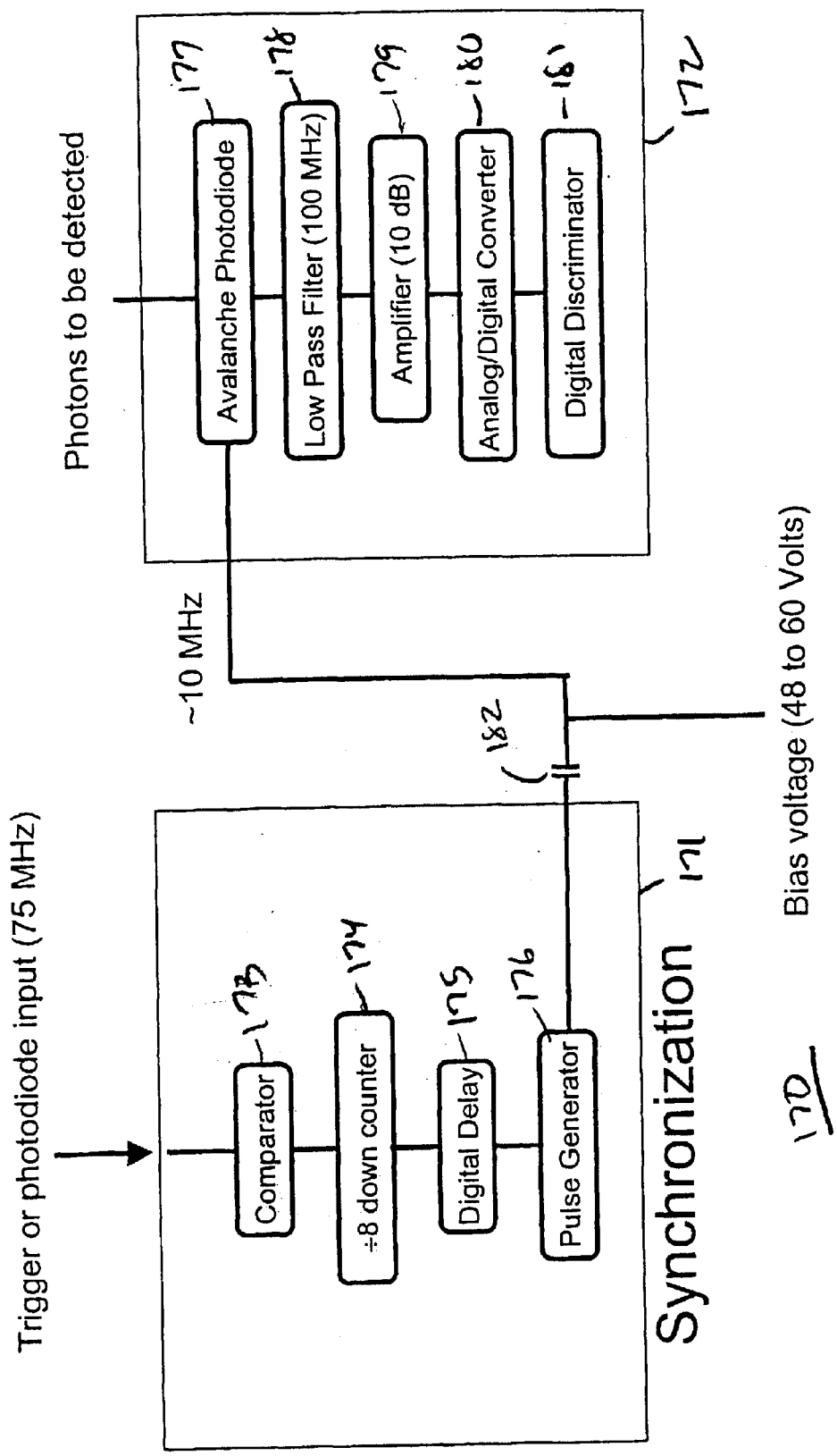
FIG. 21 is a block diagram of a second embodiment of a photon counting system in accordance with the present invention.

Referring to FIG. 21, in an alternative embodiment, a photon counting system 170 for use in the detection 32 of systems 20, 80, 120 and 140 (FIGS. 1, 11, 12 and 14) includes a synchronization component 171 and a detection component 172. The synchronization component 171 includes a comparator 173, an optional frequency divider circuit 174, a digital delay circuit 175 and a pulse generator 176. The comparator allows for recovery of the optical clock frequency. The detection component 172 includes an avalanche photodiode 177, a low pass filter 178, an amplifier 179, an analog to digital converter 180 and a digital discriminator 181.

The frequency divider circuit 174 divides the rate of the photodiode input at 75.3 MHz by eight such that the photodiode detector 177 is gated once every eight pump pulses, resulting in a pulse rate of approximately 10 MHz. The digital delay 175 adjusts the timing of triggers to the pulse generator 176 such that electrical gate pulses overlap in time with the arriving single photon level optical pulses.

A bias voltage $V_B$ of 40 to 70 volts is applied to the photodiode 177. The pulse generator 176 produces a gate pulse for the photodiode detector 177. The gate pulse is coupled through a capacitor 182 to the avalanche photodiode 177 and adds to the bias voltage to bring the photodiode into the breakdown region.

The photodiode 177 is operated in the gated-mode to detect photons. The low pass filter 178 has a cutoff frequency of 100 MHz. The amplifier 179 can be a 100 MHz amplifier. The analog to digital converter 180 samples photo current and the digital discriminator 181 outputs a signal voltage if a detection event has occurred.

The bias voltage $V_B$ (about 40 to 70 V), slightly below the avalanche breakdown voltage, is applied to the photodiode and a short gate greater than −5 volts and preferably pulse, on the order of −8V to −10 volts, at a 1 ns width or less, applied through a capacitor 162 (or 182), brings the photodiode into the breakdown region. The gate pulse is synchronized with the arrival of signal and idler photons on the photodiode synchronization component 157 (or 171). For photon counting system 150 (FIG. 20), the detector is gated once every "128" pump pulses, giving a photon-pair detection rate of 0.588 MHz. For the photon counting system 170 (FIG. 21), the detector is gated once every "128" pump pulses, giving a photon-pair detection rate of 10 MHz. The electrical signals produced by the APD in response to the incoming photons (and dark events) are reshaped by pulse shaper 197 into 80 ns (or 500 ns) wide TTL pulses that can be individually counted or sent to a TTL AND gate for coincidence counting.

The photon counting systems 150 and 170 of the present invention operate at a higher rate than those created by known prior art systems. Reported repetition rates by other groups are currently limited to 100 kilohertz, while the photon counting system of the present invention operates at 0.588 megahertz and 10 megahertz. The photodiodes APD1 and APD2 are operated at room temperature so that after-pulsing is a negligible effect up until about 20 MHz. The magnitude of the gate pulses is about 10 V, of a duration of one nanosecond or slightly shorter, to raise quantum efficiency and limit dark count rate. The high voltage, short duration gate pulses of the photon counting system enable the photon counting system to work acceptably at room temperature.

The detection of short avalanches provides difficulties. However, these difficulties are overcome by the detector of the present invention that operates in the 0.6 MHz range or in the 10 MHz range. Due to capacitive coupling through the avalanche photodiode, there is a deterministic "ringing" output waveform that lasts for about the same time as the gate pulse. The amplitude of the "ringing" output is about ten to one hundred times larger than the avalanche. Experimental data has shown that the acceptable results are obtained using a low pass filter and using a very high quality, high speed amplifier followed by either analog or digital threshold circuit.

The prior art requires cryogenically-cooling the photo-diodes. The detector provided by the present invention operates at room temperature. Moreover, the operation at 1.5 micron wavelengths allows additional benefits, including operating ten to one hundred times faster than known photodiode detectors. The use of these photodiodes with larger 10V and shorter duration (less 1 ns) gate voltage, in contrast to prior art arrangements, making operation at room temperature practical. The photodiode is biased into the avalanche region but not at the breakdown region. In this detector, the photodiodes are used for photon counting at room temperature. The gating minimizes the effects of larger dark count i.e. to get around the high dark rate. The detector according to the present invention uses gate pulses at a sub-nanosecond width, resulting in a shorter time base. In contrast, the prior art detection circuits use a 1 ns or longer pulse. Prior art detection circuits use cryogenically-cooled avalanche photodiodes. At room temperature after an avalanche occurs, trapping centers clear outmore rapidly at room temperature than at cryogenic temperatures, allowing for higher gate frequencies up to about 20 MHz

SUMMARY

Thus, the present invention provides a source of quantum-correlated and/or entangled and/or photon pairs based on four-wave mixing in a fiber near 1550 nm. Room-temperature coincidence detectors for the photons in that window (1000–1600 nm) are used in accordance with this invention. The photon-pair detection rate (~$10^3$ coincidence counts per second) is a function of the electronics employed. Likewise, the present invention includes filters for rejecting the pump photons implemented with fiber Bragg gratings, making this invention/source integrable with the existing fiber-optic infrastructure. Moreover, the detection circuits provided by the present invention are not limited to applications for the detection of quantum-correlated and/entangled photon pairs, but can be used as photon counting detectors for detecting low-light level signals, for example, or other optical communication systems such as in laser Doppler radar, in meteorology applications, in free-space optical arrangements, etc.

While preferred embodiments have been illustrated and described, it should be understood that changes and modifications can be made thereto without departing from the invention in its broadest aspects. Various features of the invention are defined in the following claims.

What is claimed is:

1. Apparatus for producing quantum correlated and/or entangled photon pairs, said apparatus comprising:
   a source of a plurality of photons;
   a control for establishing a phase difference between a first and a second said plurality of photons; and
   a fiber whose dispersion zero is close to that of the wavelength of said photon plurality coupled to said source of photons to allow at least said phase-shifted plurality of photons to propagate said fiber to effect a four-wave mixing process with said phase-shifted first and second photons for producing a quaatum correlated and/or entangled photon pair that includes a signal photon and an idler photon.

2. The apparatus according to claim 1, wherein the fiber comprises a section of straight fiber.

3. The apparatus according to claim 1, wherein a single plurality of photons is used.

4. The apparatus according to claim 1, wherein a plurality of correlated pairs are.

5. The apparatus according to claim 1 wherein the fiber comprise a Sagnac loop.

6. The apparatus according to claim 1, wherein the control includes a phase control component for establishing said phase difference between the first and second photons such that the first and second photons define a vertical component and a horizontal component for the correlated photon pair, and a delay component for producing a time shift between the first and second photons of the correlated photon pair.

7. The apparatus according to claim 1, and including a coupling device for coupling said first and second photons of said plurality to the fiber for causing horizontal component and a vertical components of said plurality to propagate the fiber whose dispersion zero is close to that of the pump wavelength in opposite directions.

8. The apparatus according to claim 7, wherein the coupling device comprise a beam splitter.

9. The apparatus according to claim 1, and including a filter interposed between said source of photons and said fiber whose dispersion zero is close to that of the pump wavelength for passing photons within a preselected bandwidth for separating correlated photons from pump photons.

10. The apparatus according to claim 1, wherein the photons of the correlated photon pair are co-polarized.

11. The apparatus according to claim 1, wherein the photons of the correlated photon pair are cross-polarized.

12. Apparatus for producing quantum correlated and/or entangled photon pairs, said apparatus comprising:
    a fiber whose dispersion zero is close to that of the pump wavelength optical fiber;
    a source of photons for pumping said fiber whose dispersion zero is close to that of the pump wavelength with photons;
    a control for producing correlated photon pairs of said photons with first and second photons of each correlated photon pair having a predetermined phase difference; and
    a filter interposed between said source of photons and said fiber for passing photons within a preselected bandwidth for separating correlated photons from pump photons, said fiber producing a signal photon and an idler photon for each of the photons of each correlated photon pair.

13. The apparatus according to claim 12, wherein the fiber comprises a section of straight fiber.

14. The apparatus according to claim 12, wherein the fiber comprise a Sagnac loop.

15. The apparatus according to claim 12, wherein the control includes a phase control component for establishing said phase difference between the first and second photons such that the photons have a vertical component and a horizontal component, and a delay component for producing a time shift between the first and second photons.

16. The apparatus according to claim 15, and including a polarization maintaining fiber component for compensating for the time shift between the first and second photons.

17. The apparatus according to claim 12, and including a coupling device for coupling said first and second photons of said plurality to the fiber for causing horizontal component and a vertical components of said plurality to propagate the fiber whose dispersion zero is close to that of the pump wavelength in opposite directions.

18. The apparatus according to claim 17, wherein the coupling device comprises a beam splitter.

19. A system for producing and detecting quantum correlated and/or entangled photon pairs, said system comprising:

a course of plurality of photons;

a control for establishing a phase difference between first and second photons of said plurality of photons to produce a correlated phase-shifted photon pair; and a fiber coupled to said source of photons to allow at least said phase-shifted plurality of photons to propagate said fiber whose dispersion zero is close to that of the pump wavelength to effect a four-wave mixing process with said phase-shifted first and second photons for producing a quantum correlated and/or entangled photon pair that includes a signal photon and an idler photon;

a free-space filter for rejecting pump photons and for separating the signal photons from the idler photons;

a first detector for detecting the signal photons separated by the free space filter; and a second detector for detecting the idler photons separated by the free space filter.

20. The system according to claim 19, wherein the fiber comprises a Sagnac loop.

21. The apparatus according to claim 19, wherein the fiber comprises a section of straight fiber.

22. The system according to claim 21, wherein the fiber incorporates a 90 degree twist in the fiber.

23. The system according to claim 21, wherein the fiber comprises a microstructure fiber.

24. The system according to claim 19, wherein the free-space filter comprises a fiber-based.

25. The system according to claim 24, wherein the fiber-based filter includes a plurality of wave division multiplexers, including at least a first wave division multiplexer for passing said signal component to said detector and at least a second wave division multiplexer for passing said idler component to said detector.

26. The system according to claim 19, wherein the first and second photons propagate the fiber whose dispersion zero is close to that of the pump wavelength in a time shifted relation.

27. The system according to claim 19, wherein the first and second photons are counter propagating signals which propagate the fiber whose dispersion zero is close to that of the pump wavelength in opposite directions.

28. The system according to claim 19, wherein the control includes a phase control component for establishing said phase difference between the first and second photons such that the first and second photons define a vertical component and a horizontal component for the correlated photon pair, and a delay component for producing a time shift between the first and second photons of the correlated photon pair.

29. The apparatus according to claim 19, and including a coupling device for coupling said correlated photon pair to the fiber whose dispersion zero is close to that of the pump wavelength for causing the horizontal component and a vertical components of each correlated photon pair to propagate the fiber in opposite directions.

30. The system according to claim 29, wherein the coupling device comprise a beam splitter.

31. The system according to claim 19, and including a filter interposed between said source of photons and said fiber whose dispersion zero is close to that of the pump wavelength for passing photons within a preselected bandwidth for separating correlated photons from pump photons.

32. The system according to claim 19, wherein the control include a phase control component for producing the phase difference between the first and second photons.

33. The system according to claim 19, wherein the control include a delay component for producing a time shift between the first and second photons.

34. The system according to claim 19, and including a polarization maintaining fiber component for compensating for the time shift between the first and second photons.

35. A method for producing quantum correlated and/or entangled photon pairs, said method comprising the steps of:

providing a source of photons;

establishing a phase difference between first and second photons of said plurality of photons to produce a correlated phase-shifted photon pair with said phase-shifted first and second photons; and pumping a fiber whose dispersion zero is close to that of the pump wavelength with said correlated photon pair to effect a four-wave mixing process with the first and second photons of said correlated photon pair for producing a polarization-entangled photon pair that includes a signal photon and an idler photon for each of said first and second photons.

36. The method according to claim 35, wherein the fiber comprises a straight, non-linear fiber.

37. The method according to claim 35, wherein the fiber comprise a Sagnac loop.

38. The method according to claim 35, and including causing horizontal and vertical component of said correlated photon pair to propagated the non-linear fiber in opposite directions.

39. The method according to claim 35, and including separating the signal photons and the idler photons from pump and for separating the signal photons from the idler photons.

40. The method according to claim 35, and including directing the photons towards free-space filter for separating the signal photons and the idler photons from pump photons and for separating the signal photons from the idler photons.

41. The method according to claim 35, and including interposing a filter between said source of photons and said fiber for passing photons within a preselected bandwidth for separating correlated photons from pump photons.

42. The method according to claim 35, including causing the first and second photons to propagate the fiber whose dispersion zero is close to that of the pump wavelength in a time shifted relation.

43. The method according to claim 42, and including for compensating for the time shift between the first and second photons after the correlated photons have been polarization-entangled.

44. The method according to claim 35, and including causing the first and second photons to propagate the fiber in opposite directions.

45. The method for producing quantum correlated and/or entangled photon pairs, said method comprising the steps of:

providing a source of photons;

deriving from said photons correlated pairs of photons with first and second photons of each pair of correlated photons having a predetermined phase difference;

pumping a fiber whose dispersion zero is close to that of the pump wavelength with said correlated photon pairs for producing a polarization-entangled photon pair that includes a signal photon and an idler photon for each of said first and second photons.

* * * * *